Nov. 10, 1942.   O. F. SMETANA   2,301,469
METHOD OF PRODUCING FLAT KNITTED SELVAGED FABRICS
Filed Oct. 24, 1941   24 Sheets-Sheet 1
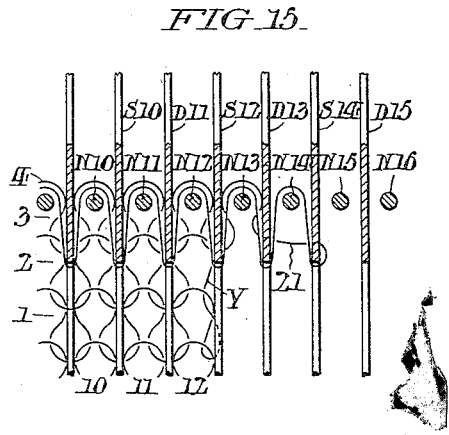
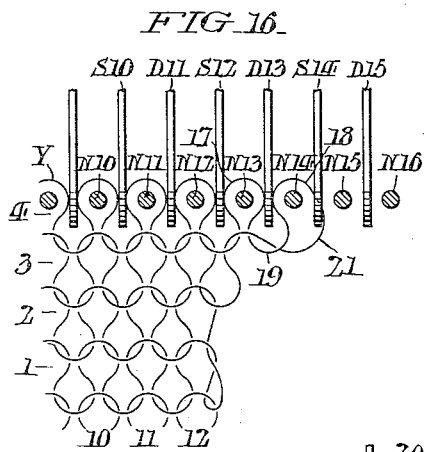
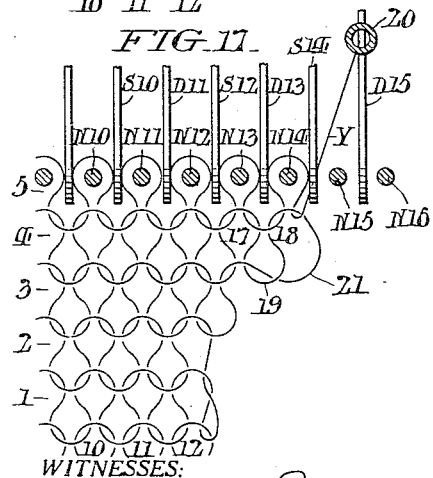
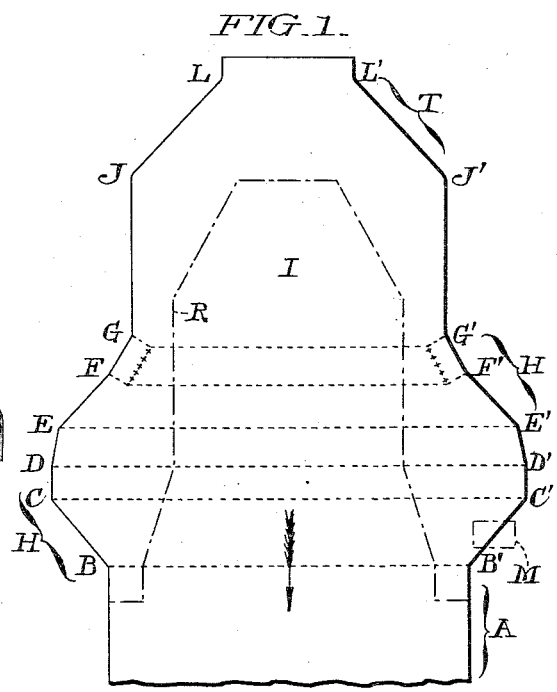
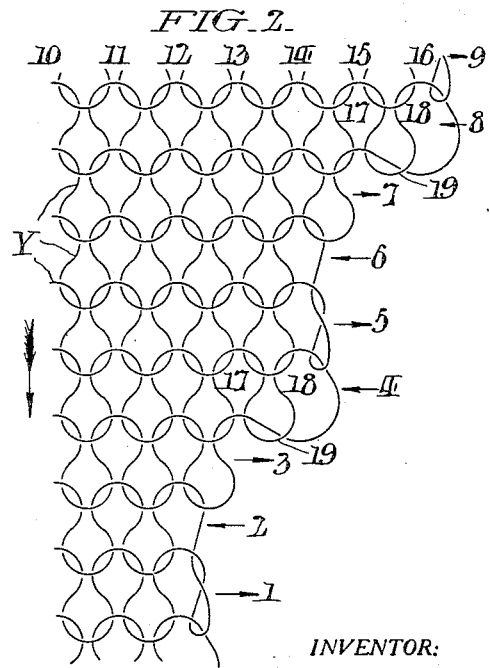
WITNESSES:
INVENTOR:
Otto F. Smetana,
BY
ATTORNEYS.

Nov. 10, 1942. O. F. SMETANA 2,301,469
METHOD OF PRODUCING FLAT KNITTED SELVAGED FABRICS
Filed Oct. 24, 1941 24 Sheets-Sheet 2
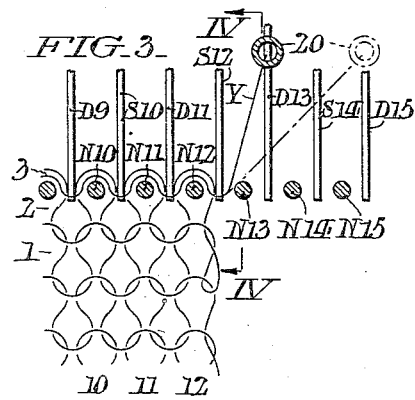
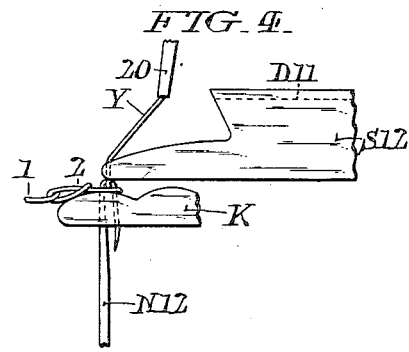
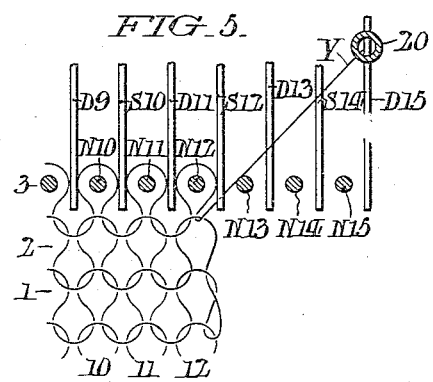
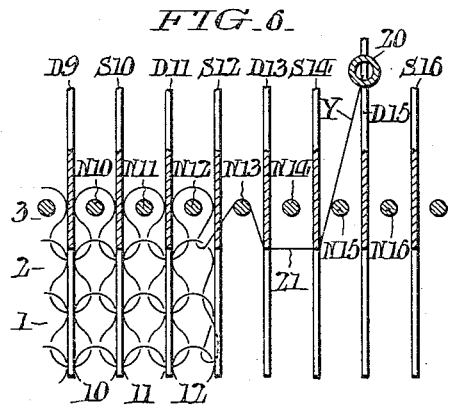
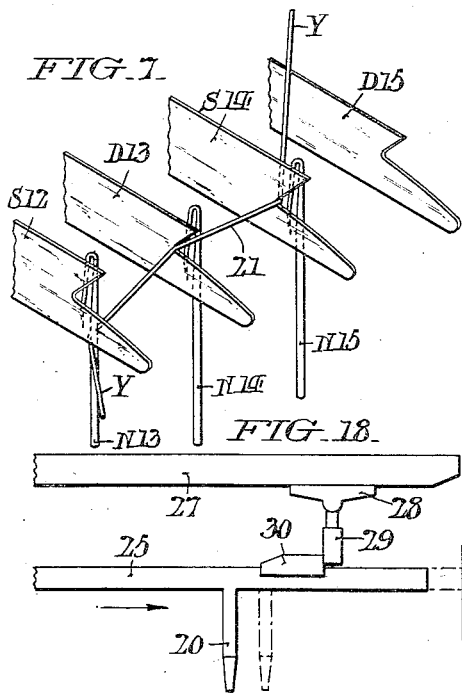
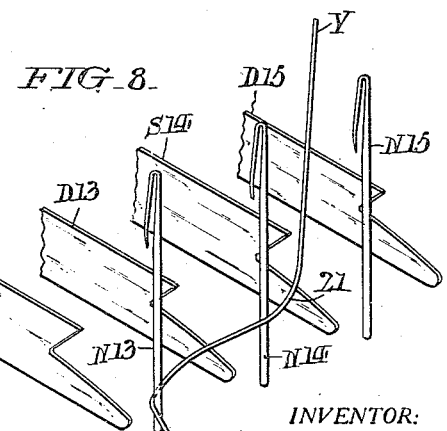
INVENTOR:
Otto F. Smetana,
BY Paul Paul
ATTORNEYS.

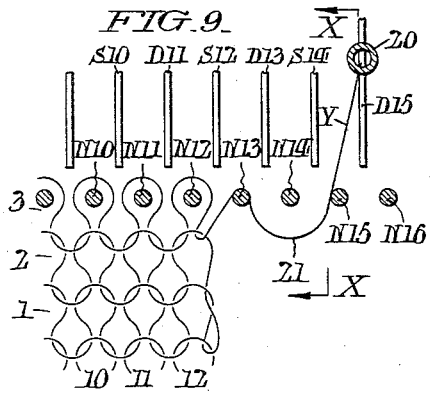
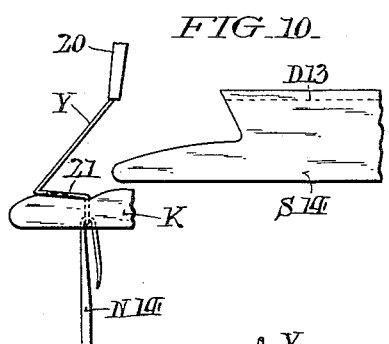
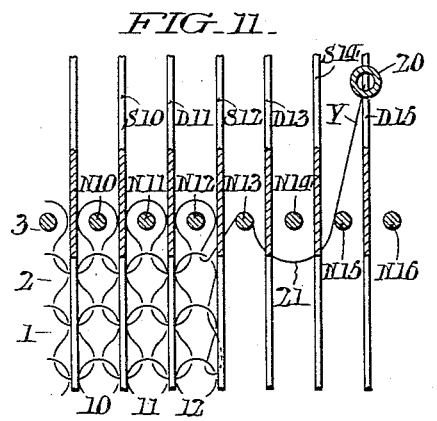
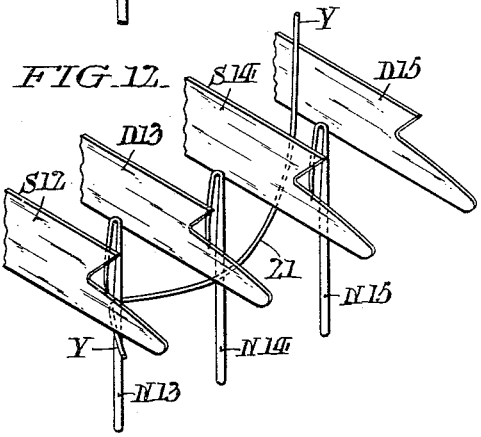
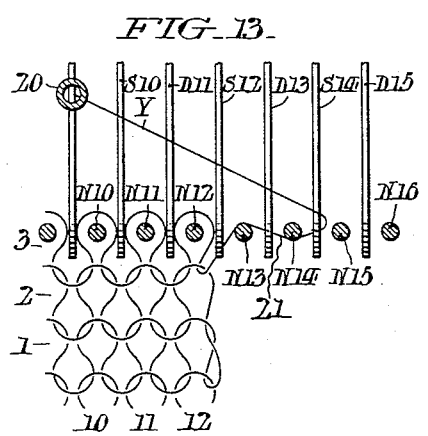
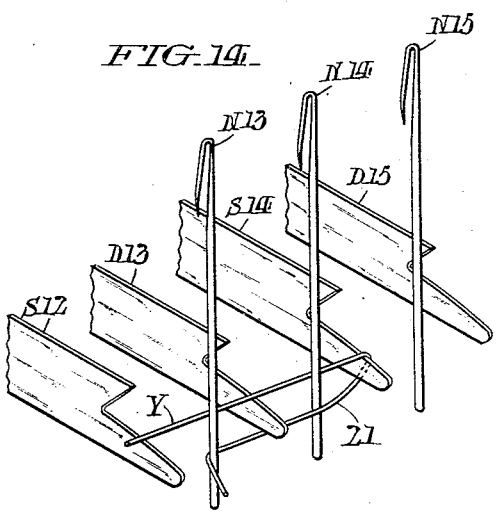

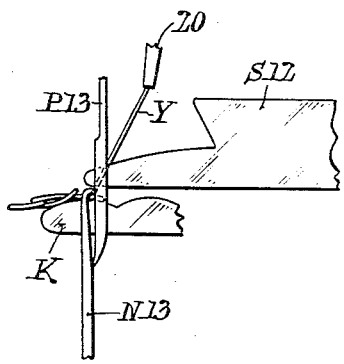
FIG_20_
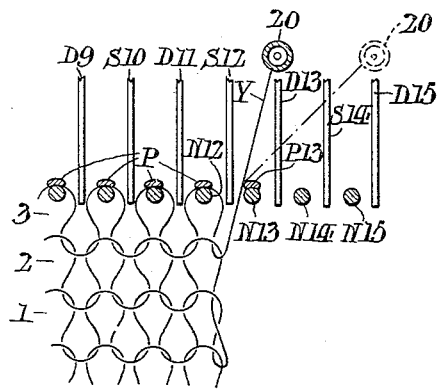
FIG_19_
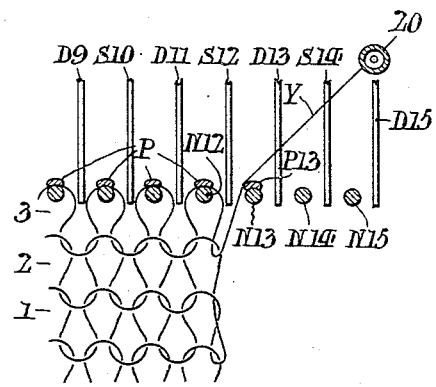
FIG_21_
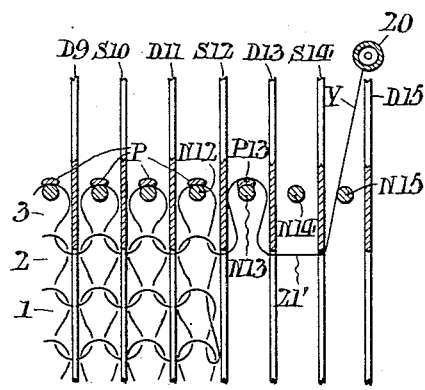
FIG_22_
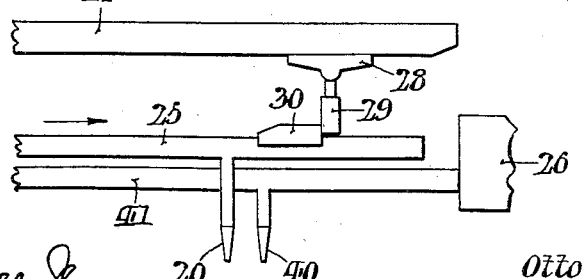
FIG_31_

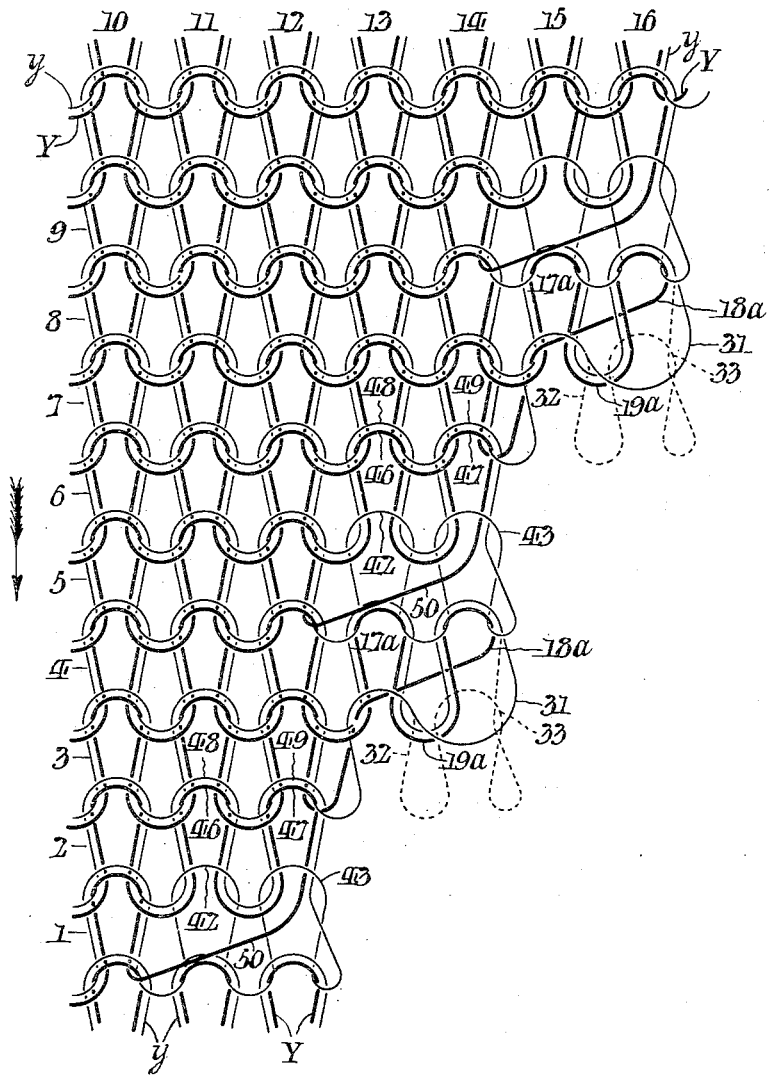

Nov. 10, 1942.  O. F. SMETANA  2,301,469
METHOD OF PRODUCING FLAT KNITTED SELVAGED FABRICS
Filed Oct. 24, 1941   24 Sheets-Sheet 6
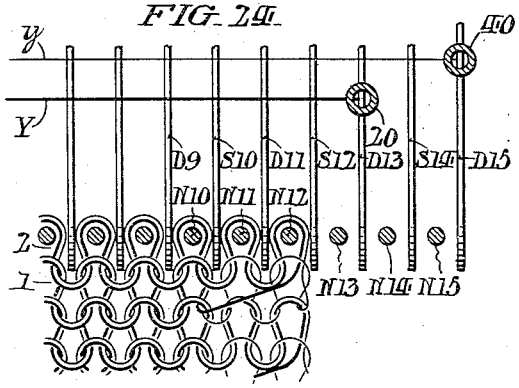
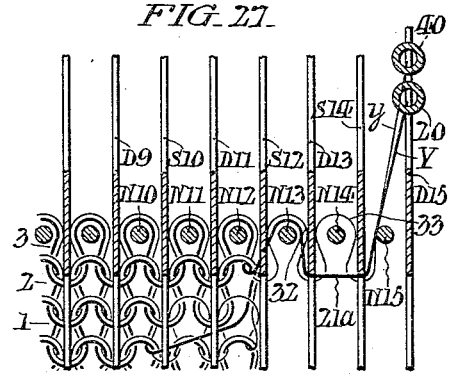
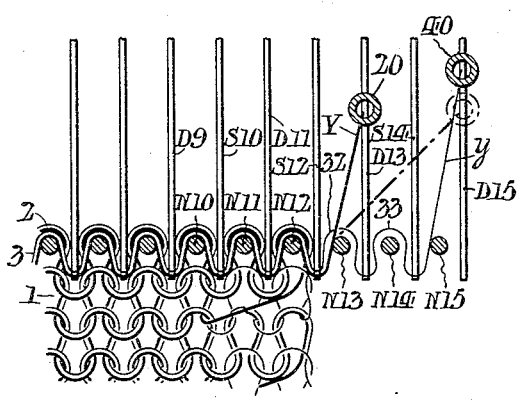
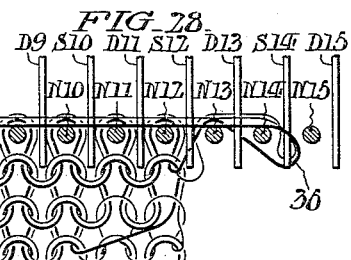
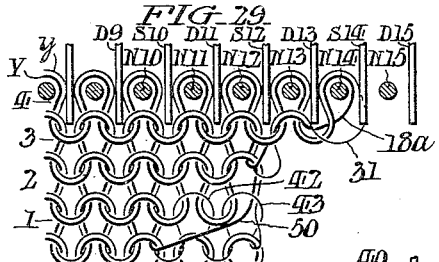
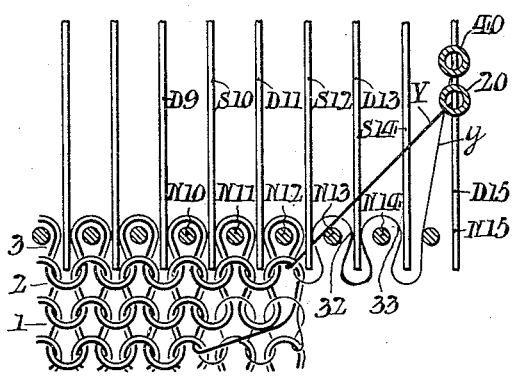
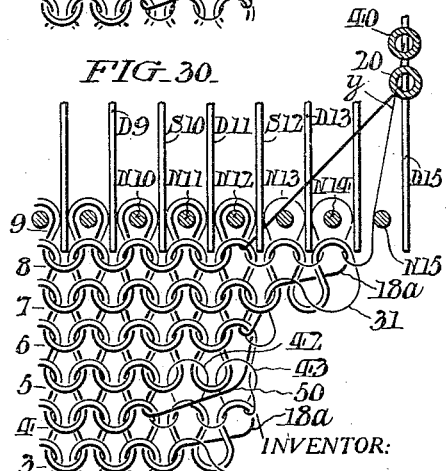
WITNESSES:
Thomas W. Kerr, Jr.
Hubert Fuchs
INVENTOR:
Otto F. Smetana,
BY Paul & Paul
ATTORNEYS.

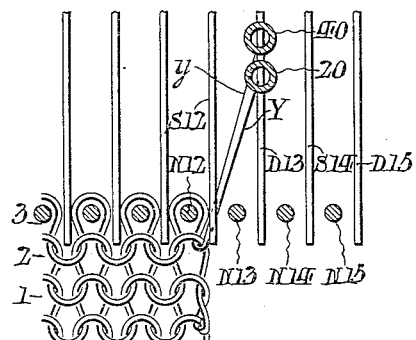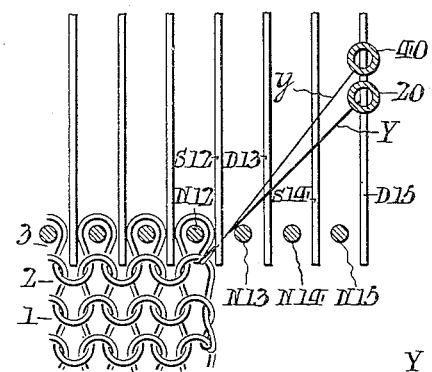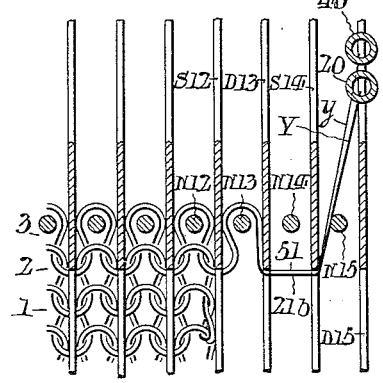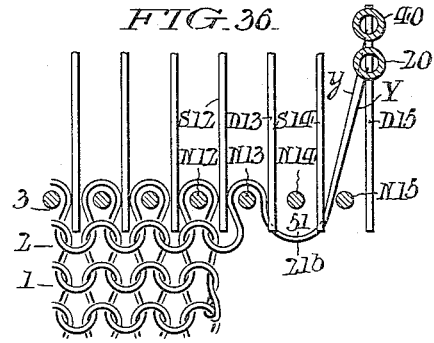

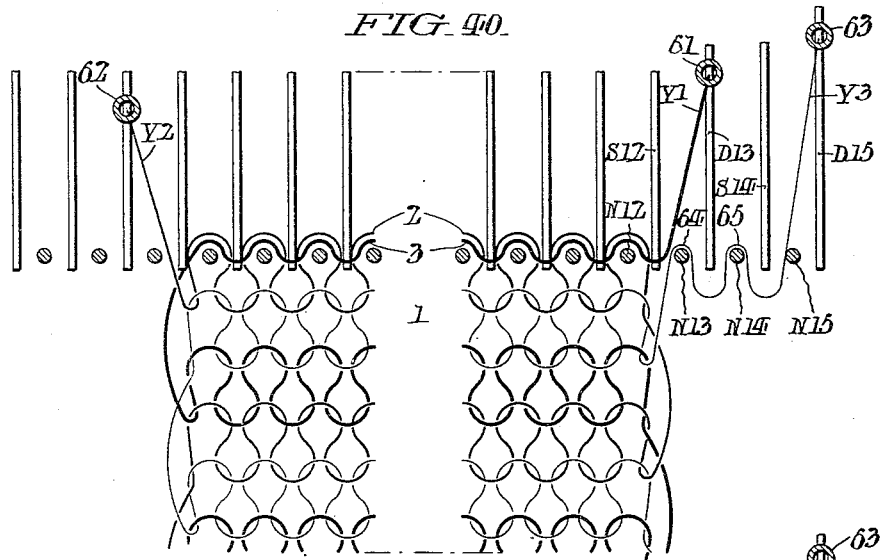
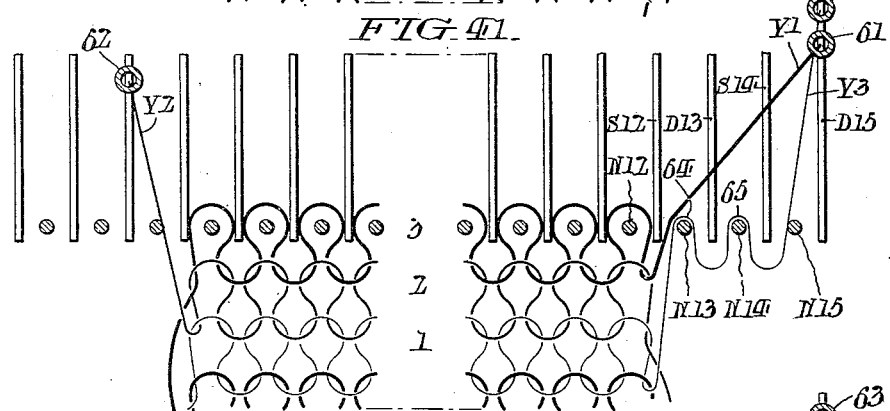
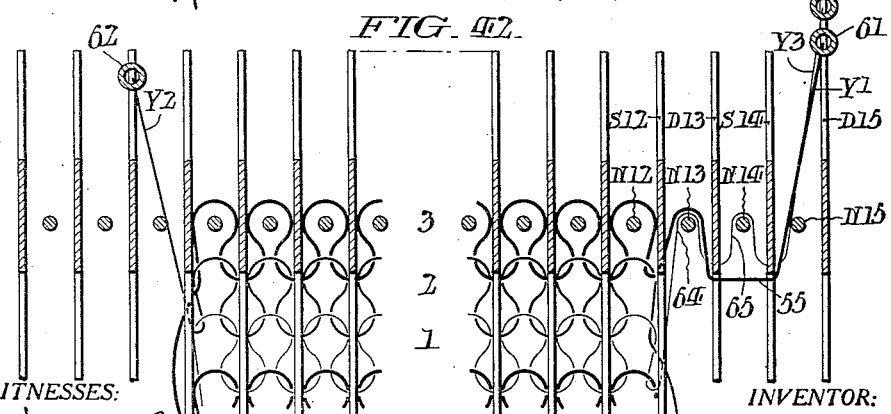

Nov. 10, 1942.  O. F. SMETANA  2,301,469
METHOD OF PRODUCING FLAT KNITTED SELVAGED FABRICS
Filed Oct. 24, 1941  24 Sheets-Sheet 10
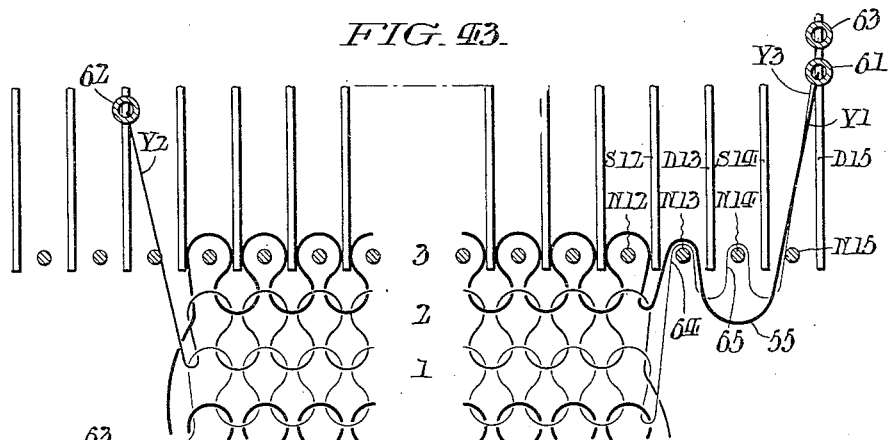
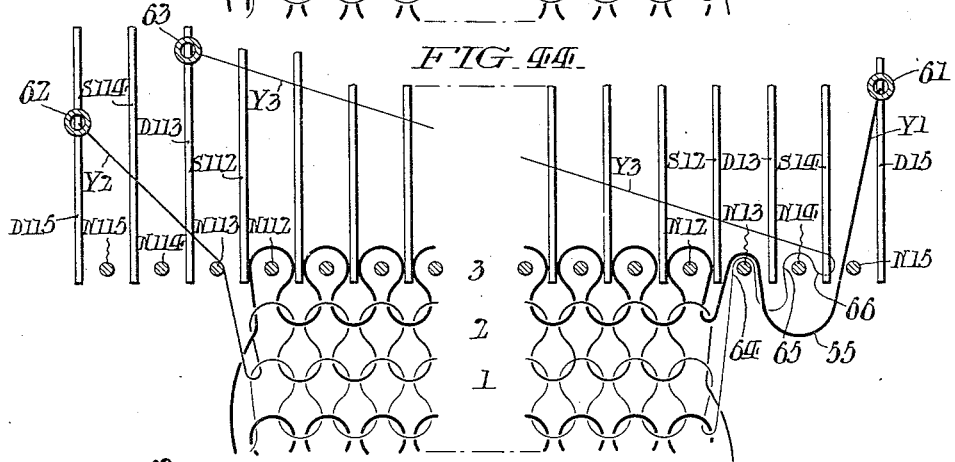
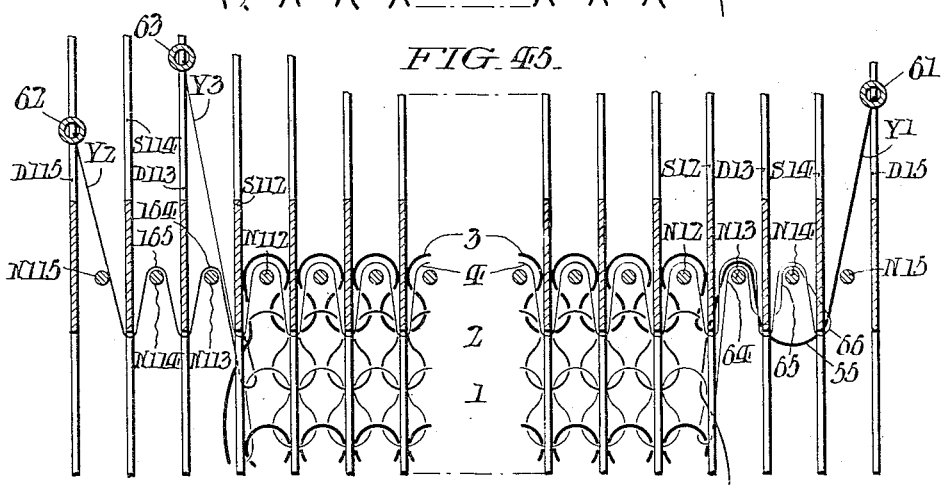

Nov. 10, 1942. O. F. SMETANA 2,301,469
METHOD OF PRODUCING FLAT KNITTED SELVAGED FABRICS
Filed Oct. 24, 1941 24 Sheets-Sheet 11
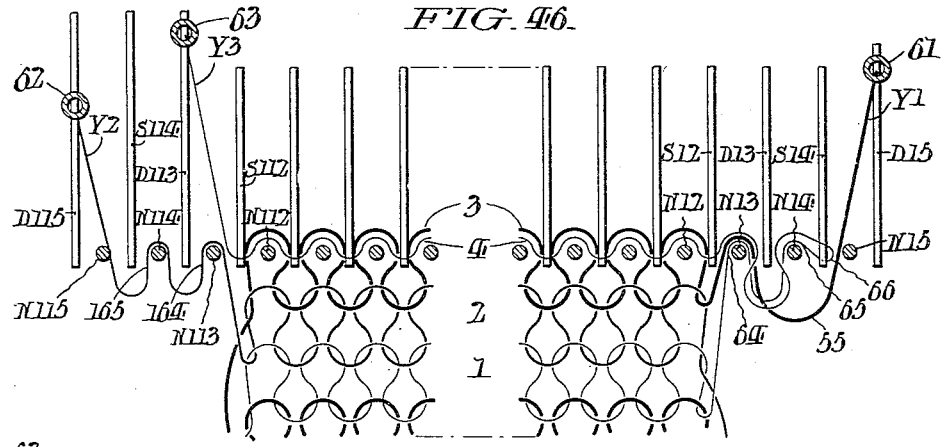
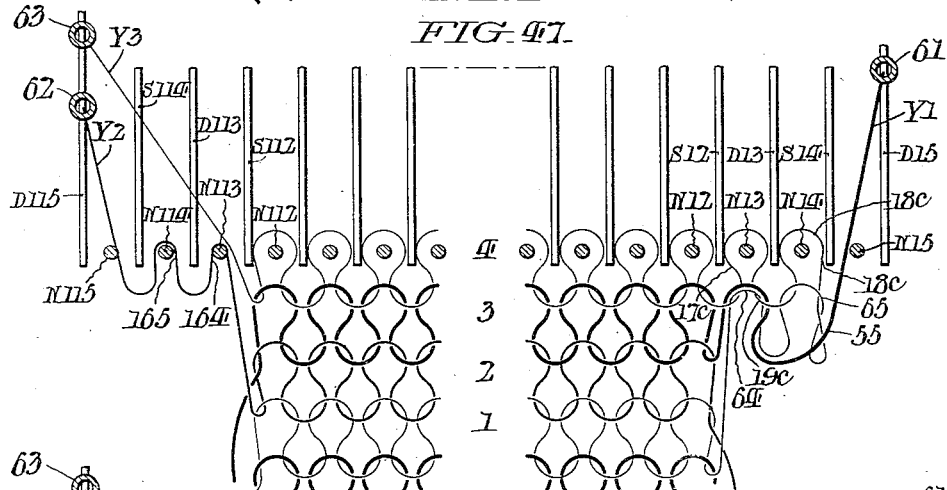
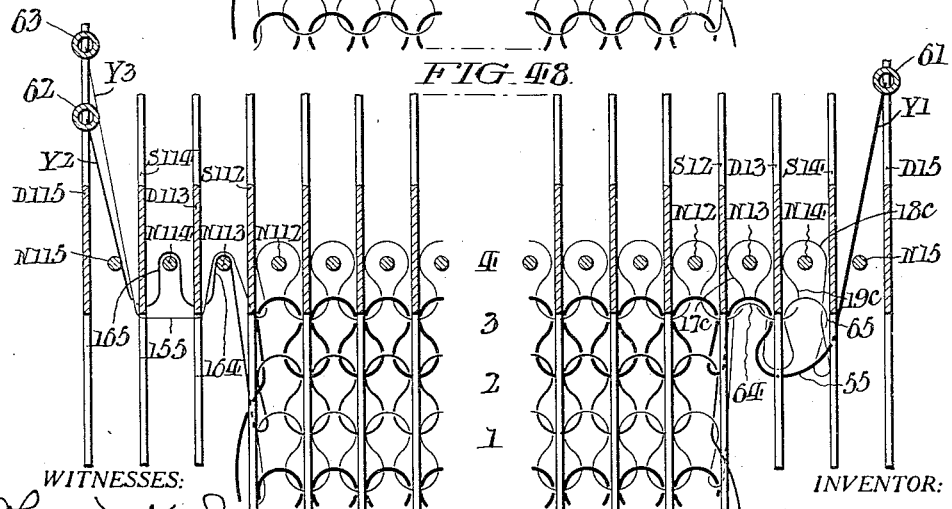

Nov. 10, 1942.   O. F. SMETANA   2,301,469
METHOD OF PRODUCING FLAT KNITTED SELVAGED FABRICS
Filed Oct. 24, 1941
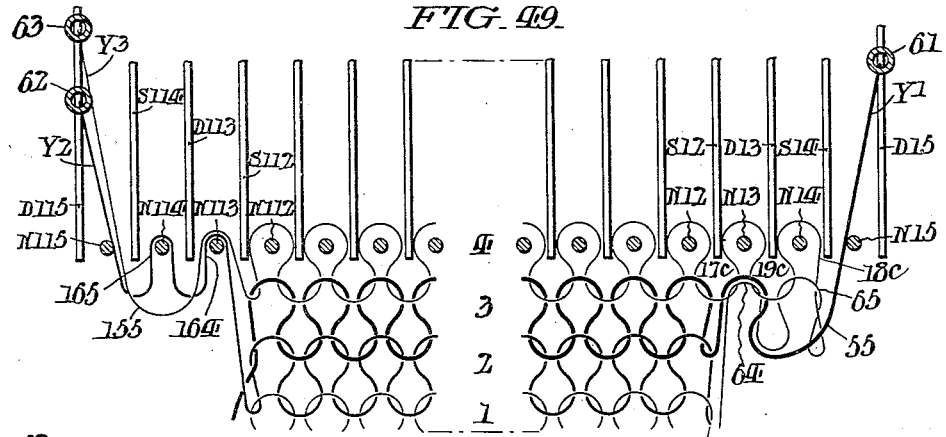
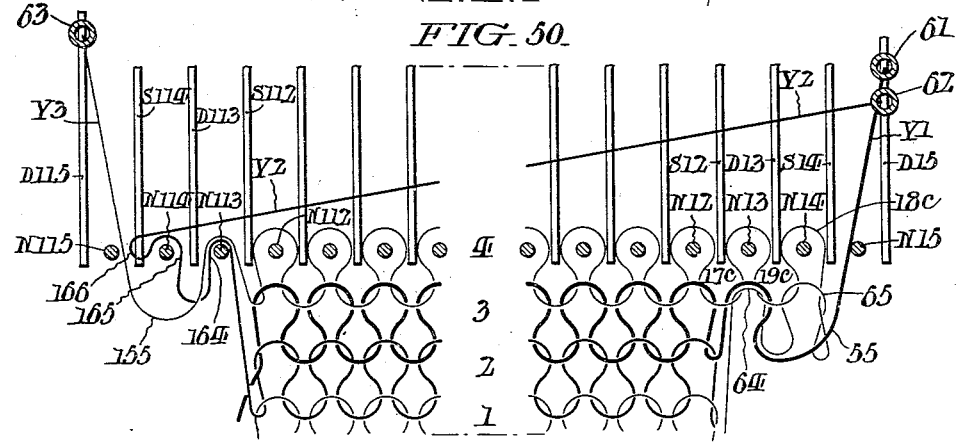
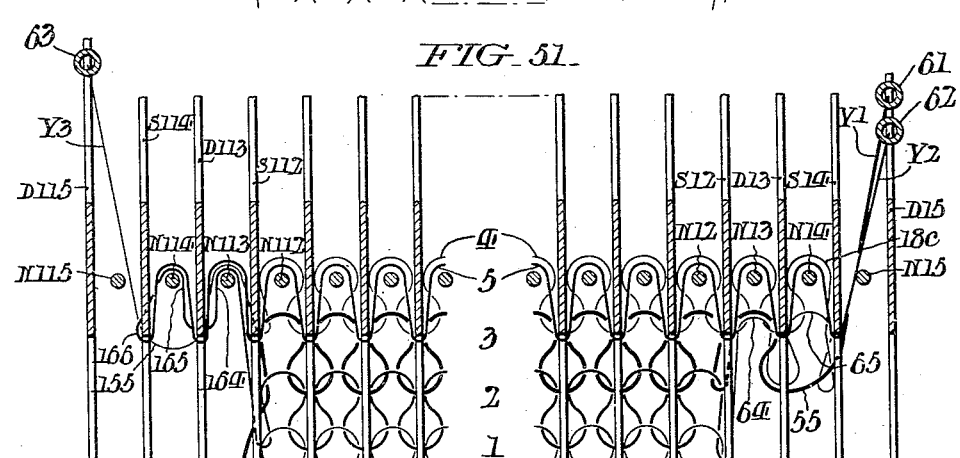

Nov. 10, 1942.  O. F. SMETANA  2,301,469
METHOD OF PRODUCING FLAT KNITTED SELVAGED FABRICS
Filed Oct. 24, 1941  24 Sheets-Sheet 13

WITNESSES:
Thomas W. Kerr, Jr.
Hubert Fuchs

INVENTOR:
Otto F. Smetana,
BY
Paul & Paul
ATTORNEYS.

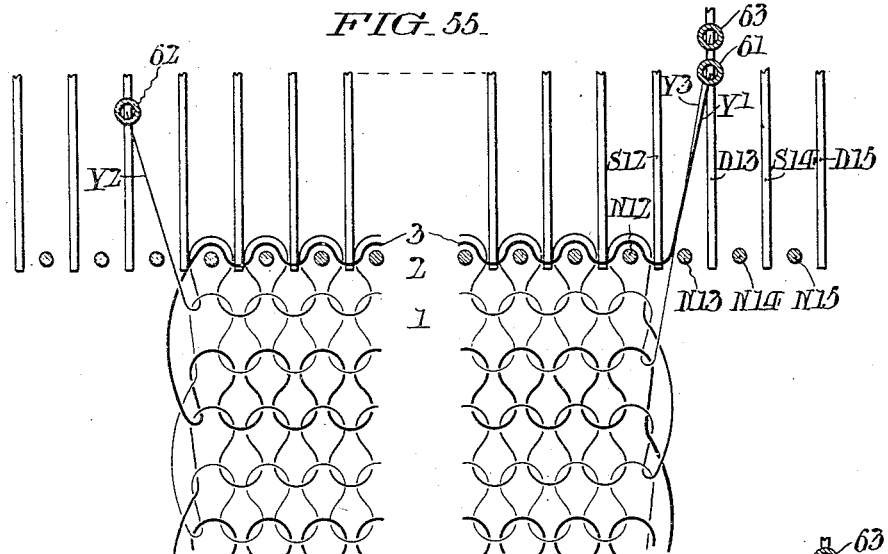
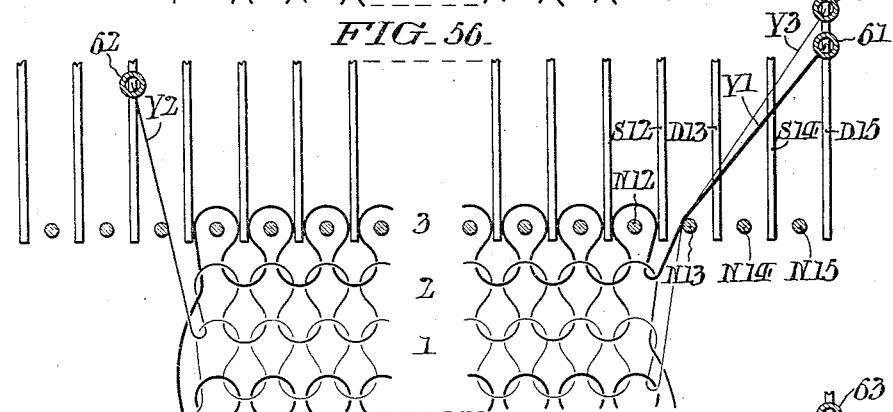
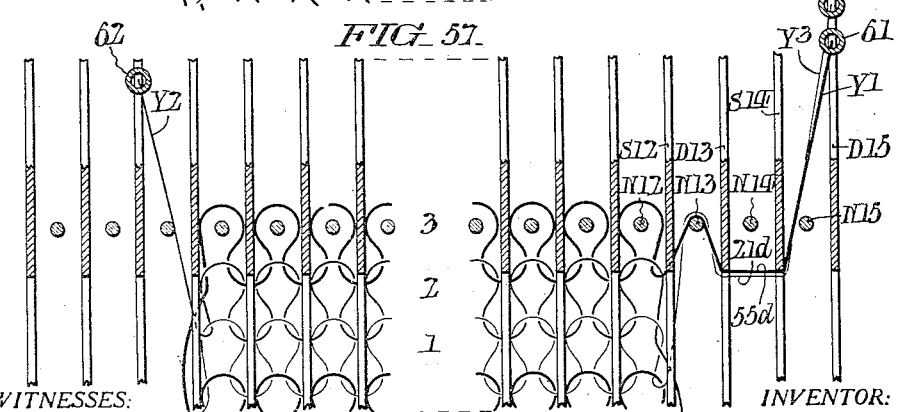

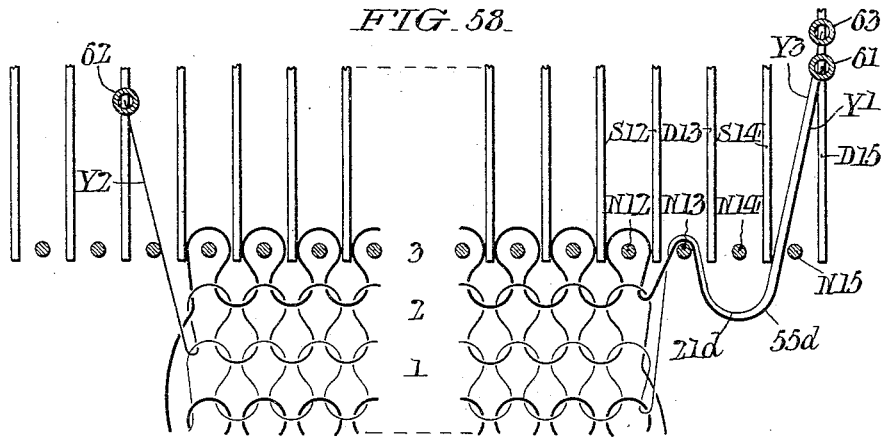
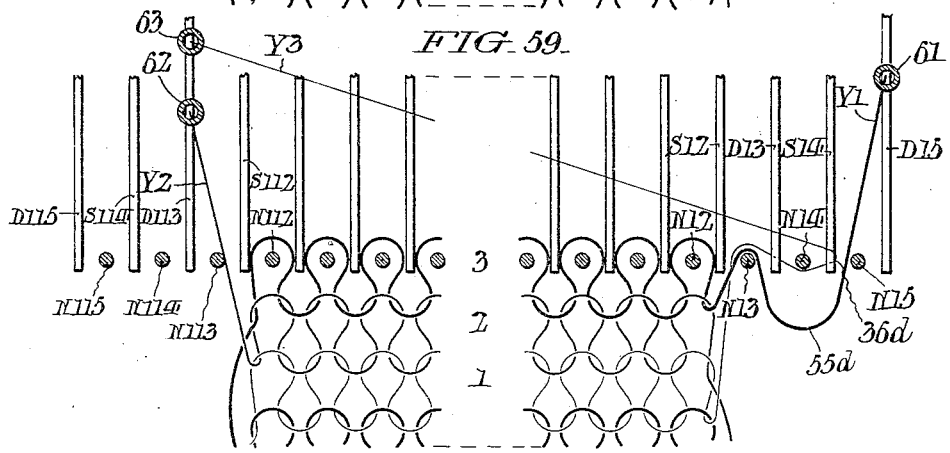
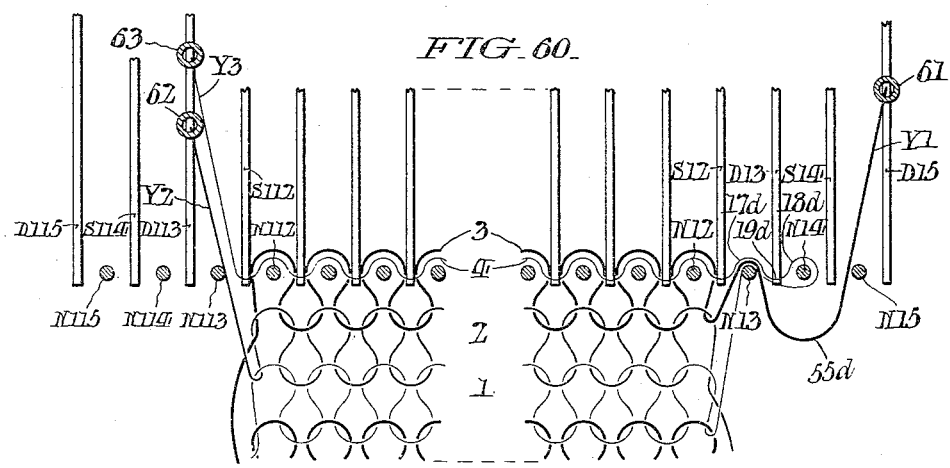

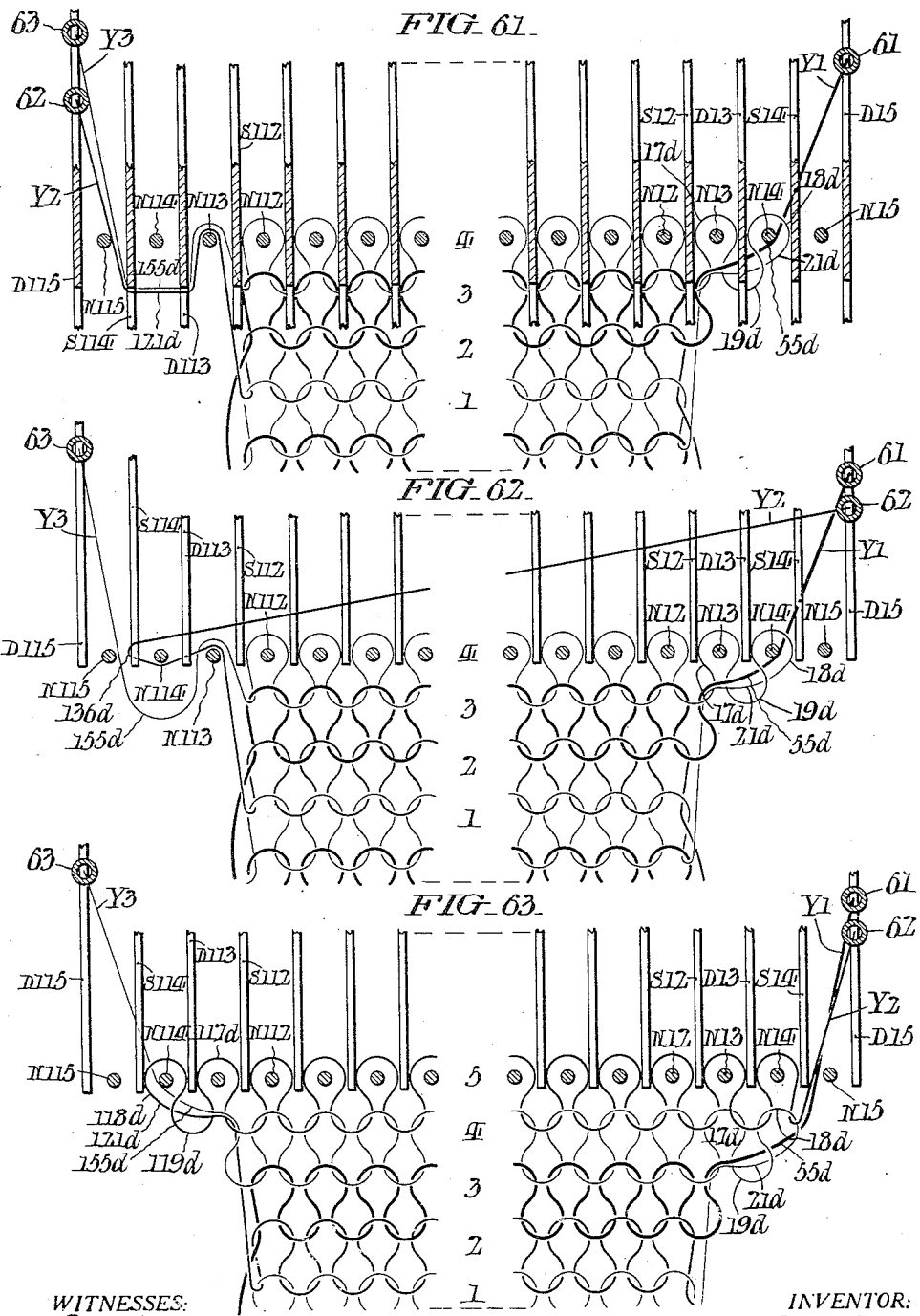

Nov. 10, 1942.  O. F. SMETANA  2,301,469
METHOD OF PRODUCING FLAT KNITTED SELVAGED FABRICS
Filed Oct. 24, 1941  24 Sheets-Sheet 18

WITNESSES:
Thomas W. Kerr Jr.
Hubert Fuchs

INVENTOR:
Otto F. Smetana,
BY Paul & Paul
ATTORNEYS.

Nov. 10, 1942.　　　O. F. SMETANA　　　2,301,469
METHOD OF PRODUCING FLAT KNITTED SELVAGED FABRICS
Filed Oct. 24, 1941　　　24 Sheets-Sheet 20
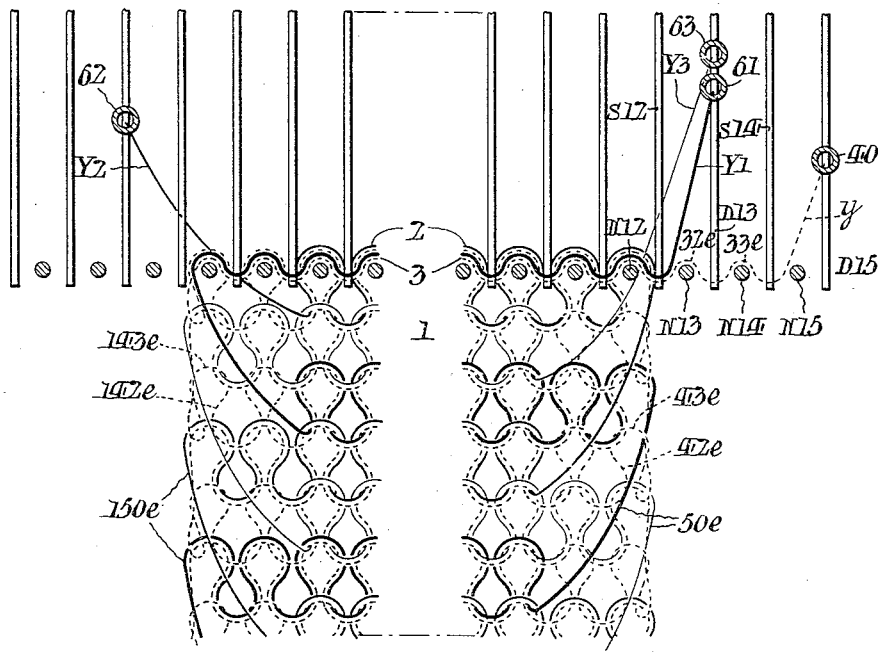
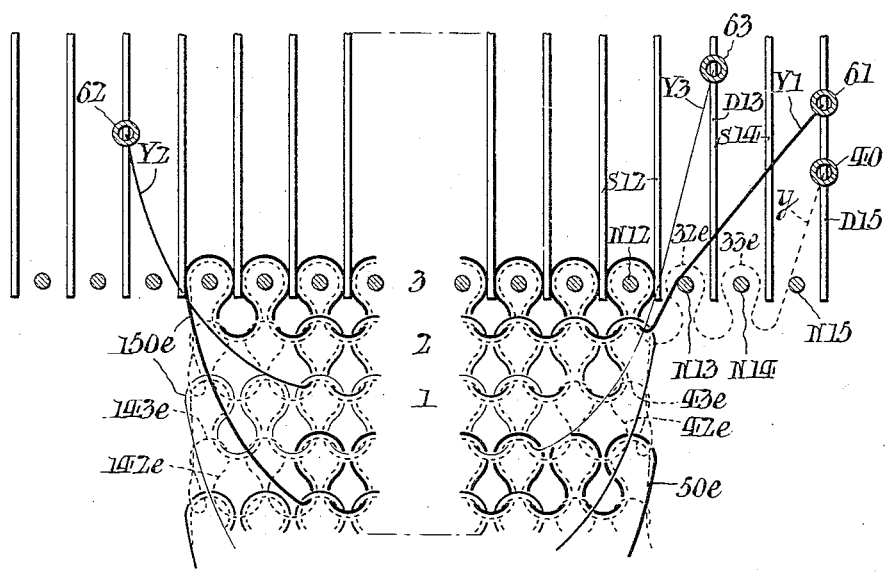

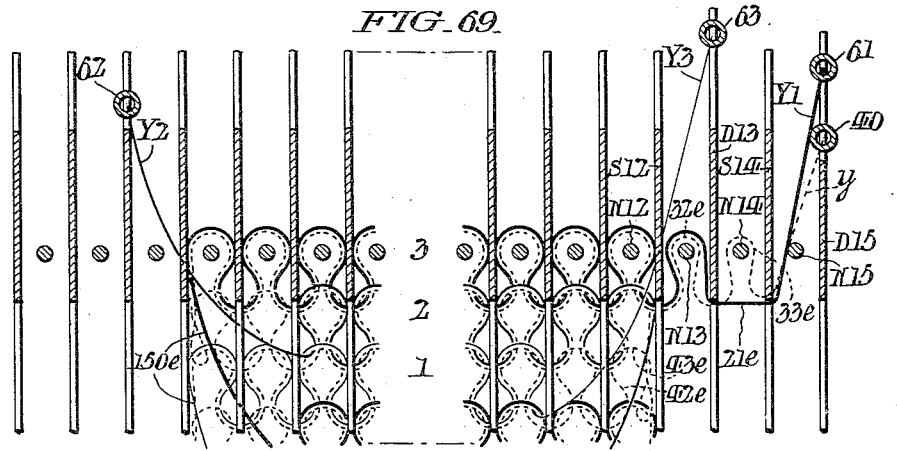
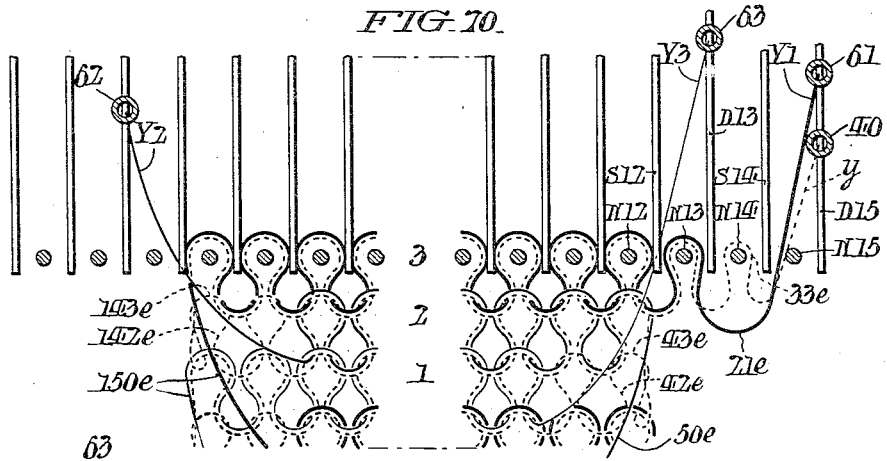
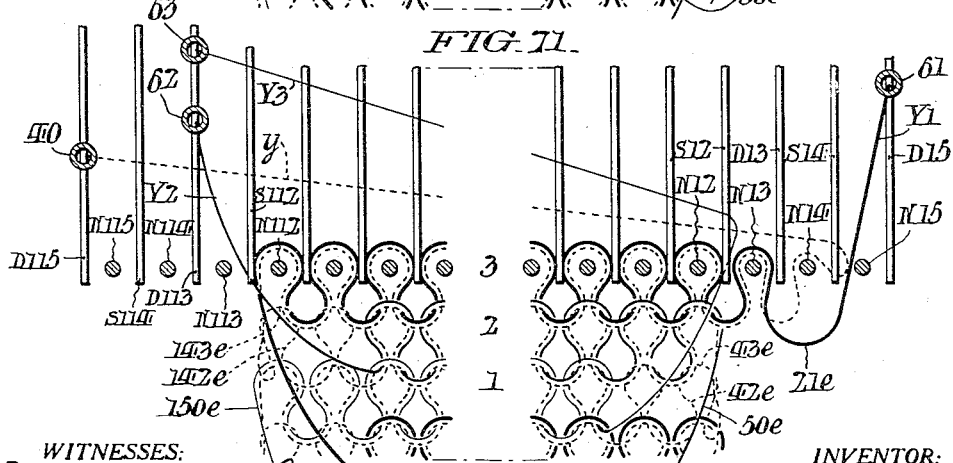

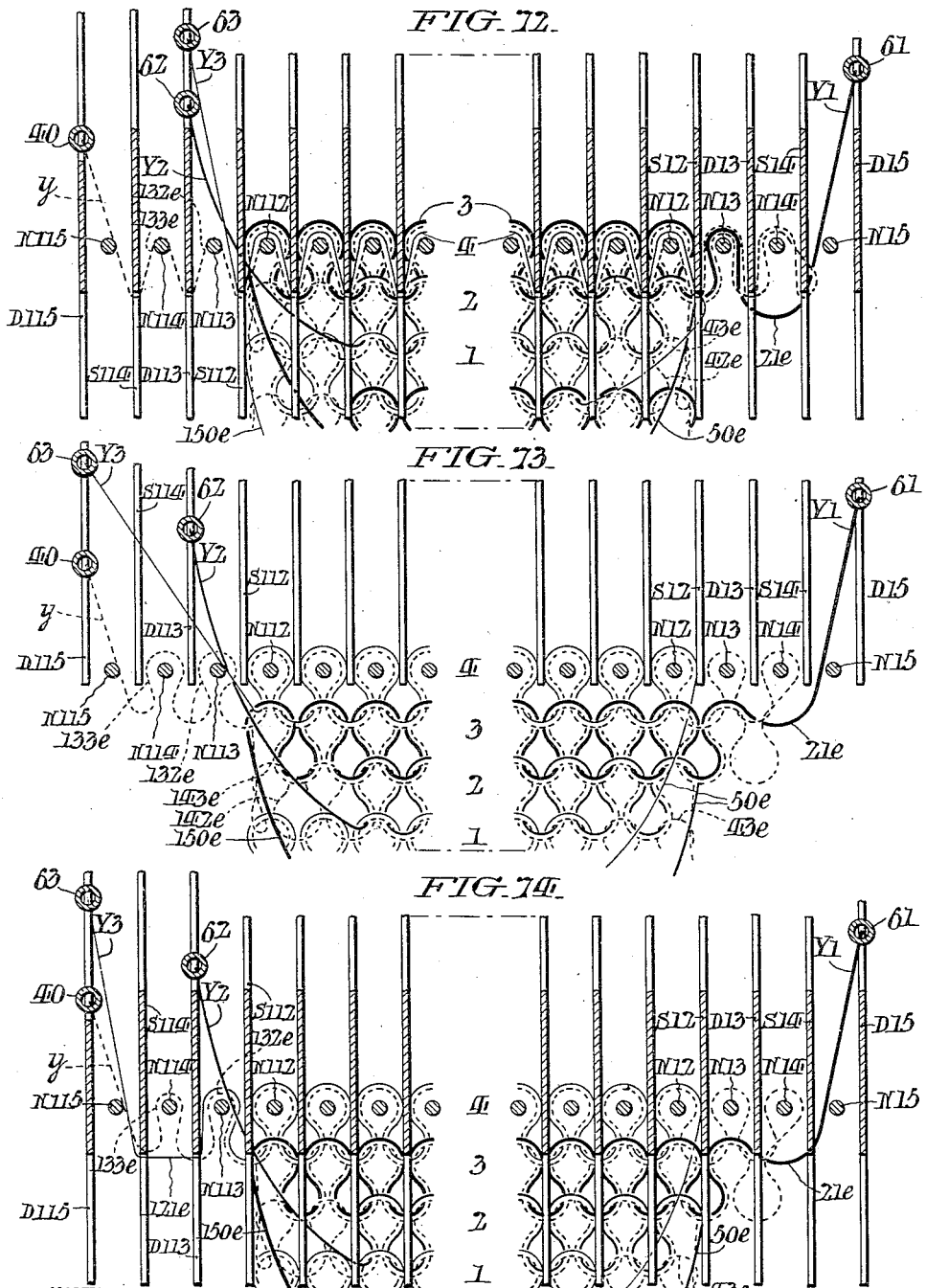

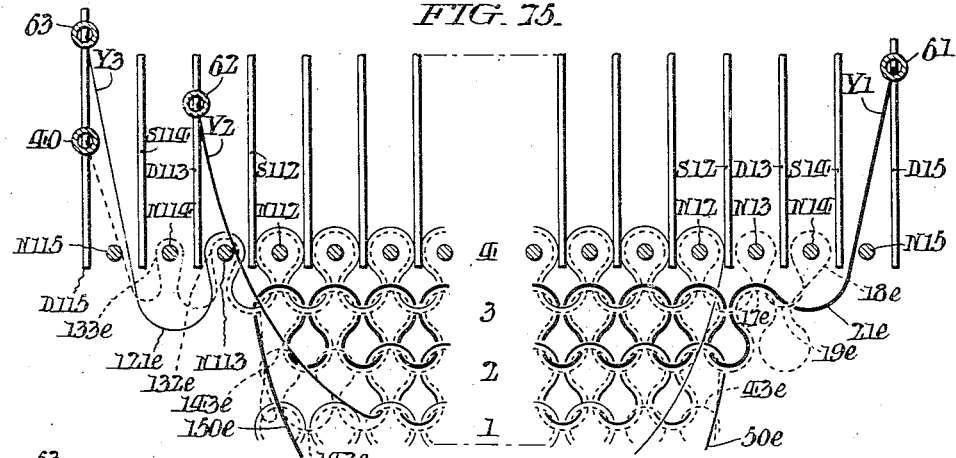
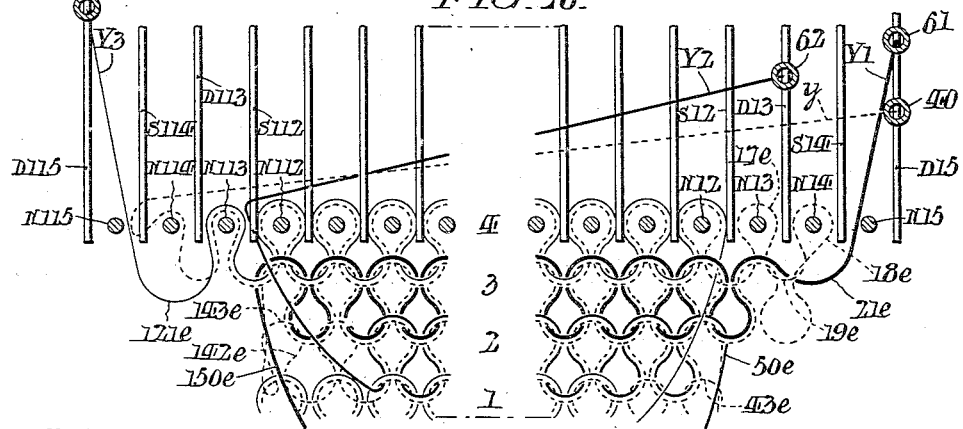
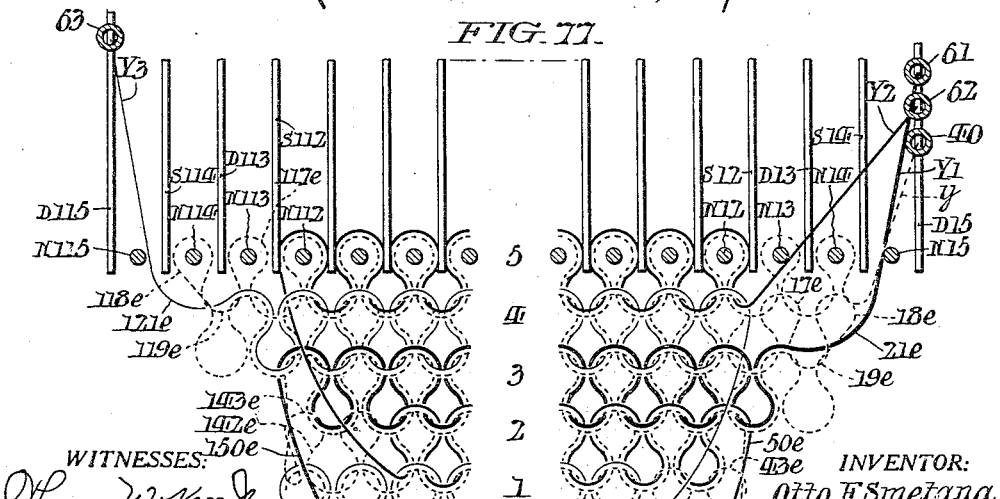

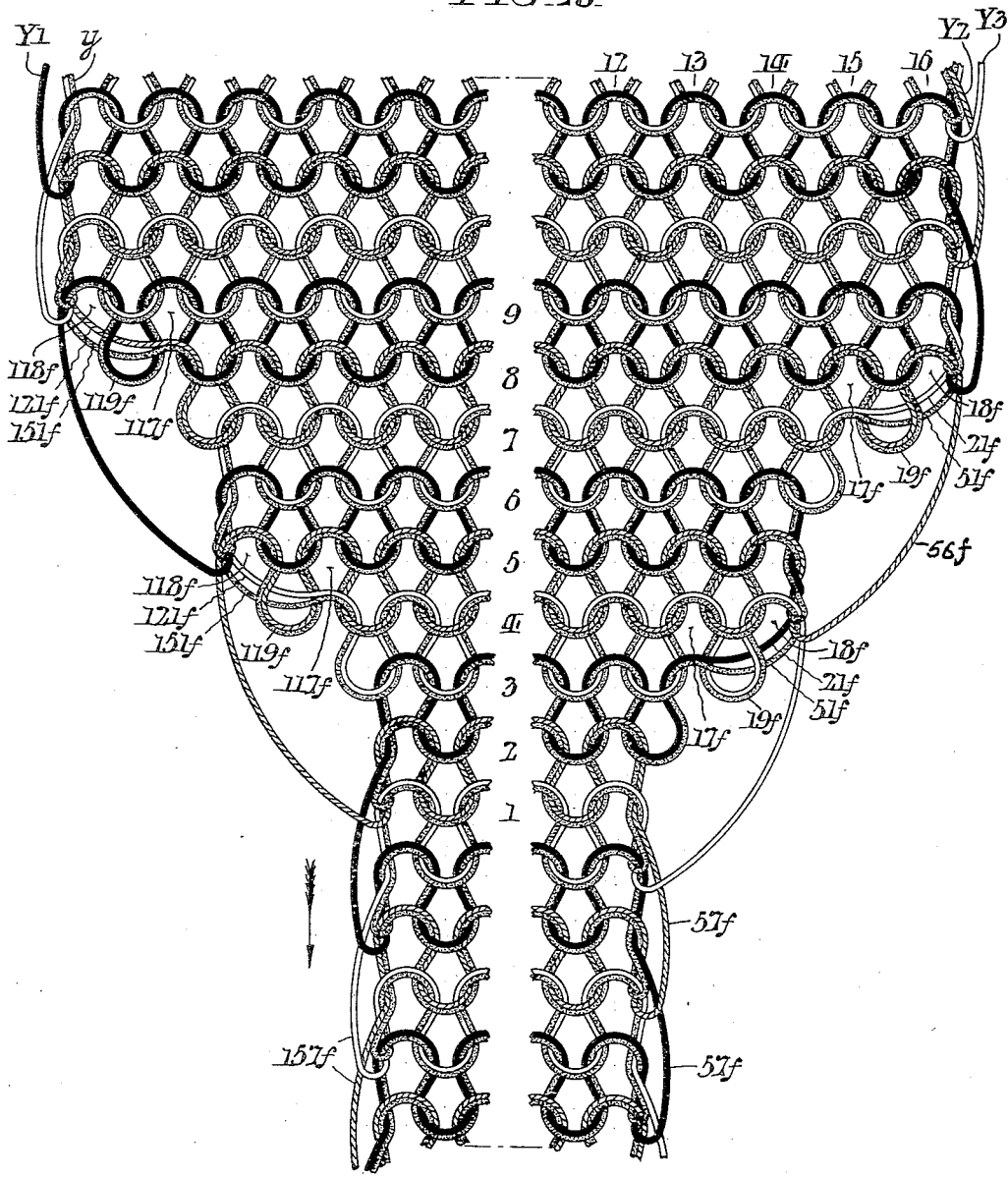

Patented Nov. 10, 1942

2,301,469

UNITED STATES PATENT OFFICE 2,301,469

METHOD OF PRODUCING FLAT KNITTED SELVAGED FABRICS

Otto F. Smetana, Concord, N. C.

Application October 24, 1941, Serial No. 416,324

18 Claims. (Cl. 66—89)

This invention is concerned with methods of producing flat knitted selvaged fabrics. More specifically it has reference to flat knitted selvaged fabrics which are widened by addition periodically as the knitting proceeds, of additional loops at the side edges in certain courses. Such widening is at the present time extensively practiced in the production in one operation, of continuous and complete blanks for what are generally known as fashioned "round" or "pocket" heel stockings, in which blanks the upper portions of the heel cheeks or tabs extend outwardly beyond the side edges of the angle portion.

My invention has for its main objects to make it possible to lock the added end loops at the selvages in the widened portions of such fabric against ravelling irrespective as to whether the fabric is made plain from a single thread, or reinforced by the use of an auxiliary splicing thread in the knitting, or whether it be made as a plain ringless fabric from a plurality of yarns of the same kind and count used in a definite order and in repeating sequence during the knitting, or as a ringless fabric with reinforcement; and to enable the loop locking to be effected during either ordinary knitting phases or during ordinary narrowing phases of a standard flat knitting machine of the "Cotton" type, without necessitating in the latter instance, sidewise transfer and doubling of adjacent loops, and without entailing any radical structural changes in the machines or any alteration in their normal mode of operation. The expression "narrowing phases" as above used has reference to those times in the operation of a flat full fashioned knitting machine when the main cam shaft is shifted to bring into action rotary cams thereon for actuating the usual dipping arms which carry the points whereby fabric loops are laterally transferred between adjacent needles.

The foregoing objectives I realize in practice as hereinafter more fully set forth, by resorting to a novel procedure or cycle, wherein, during the laying of yarn for a widened course in a knitting phase of the machine, the end stop toward which the carrier is moving is shifted outward by a distance of one or more needles; wherein the yarn carrier is temporarily arrested after it has traversed the previously active needles until the loops of the current course are drawn by the needles; and wherein just before the needles have reached their lowermost position, the carrier is released for movement outward to the extent allowed by the changed position of the end stop, by the friction box before completion of the current couliering stroke. Incident to the further shift thus given to the carrier, an extra length of the yarn is drawn over the ends of the sinker and divider associated with the endmost needle of the added needles, so that upon subsequent advance of the sinkers and dividers in the usual way before the needles rise, the extra length of the yarn is displaced in the form of a bight rearward of said endmost needle and so temporarily held. During subsequent rise of the needles, the endmost needle will thus come up within said bight, and, as a consequence, there will be formed on said needle when the next course is drawn, a twisted locked selvage loop which will positively hold the corresponding fabric wale against subsequent ravelling. The same result is attained, as also hereinafter more fully described, by first completing a course in a knitting cycle, and thereafter giving the end stop its outward shift in a narrowing phase at a time when the sinkers are retracted, the yarn carrier being moved as a consequence of being latched to said stop.

Other objects and attendant advantages will appear from the following detailed description when taken in connection with the attached drawings, wherein Fig. 1 is a fragmentary view of a full fashioned round or pocket heel stocking blank having, at the upper widened portions of its lateral heel projections, locked selvage loops made in accordance with my invention.

Fig. 2 is a digrammatic view showing the texture of the fabric at one of the widened selvages within the area of the rectangle M in Fig. 1.

Figs. 3–17 are successive diagrammatic views, some in plan, some in section, and others in perspective, showing successive steps in my novel cycle of forming one of the widened courses of the fabric of Fig. 2 during either a knitting phase or a narrowing phase of the knitting machine.

Fig. 18 is a diagrammatic view showing how the carrier for the yarn is controlled in accordance with my invention to determine the formation of the locked selvage loops of Fig. 2 during knitting phases of the machine.

Figs. 19, 20, 21 and 22 are successive views showing how the selvages in the fabric of Fig. 2 may be formed with the use of needle covering points during the narrowing phases of the machine.

Fig. 23 is a view like Fig. 2 of a widened reinforced fabric made in accordance with my invention by use of an additional yarn in the knitting, and by locking of the selvage loops in the widened courses during knitting phases of the machine.

Figs. 24–30 are views similar to Figs. 3–17 showing successive steps in the formation of the reinforced widened fabric of Fig. 23.

Fig. 31 is a view similar to Fig. 18 showing how the carriers for the main and reinforcing yarns are controlled incident to the formation of the widened courses of the fabric shown in Fig. 23.

Fig. 32 is a view like Fig. 2 showing reinforced fabric likewise produced in accordance with my invention but in which the widened courses are formed during narrowing phases of the knitting machine.

Figs. 33–38 illustrate successive steps in the production of the fabric shown in Fig. 32.

Figs. 40–53 illustrate successive steps in the production of the fabric of Fig. 39.

Figs. 55–65 illustrate successive steps in the production of the fabric of Fig. 4.

Figs. 67–77 illustrate successive steps in the production of the fabric shown in Fig. 66; and Fig. 78 is a view like Fig. 2 showing three thread reinforced ringless fabric in which the locked selvages of the widened courses are formed during widening phases of the machine.

Figure 39:
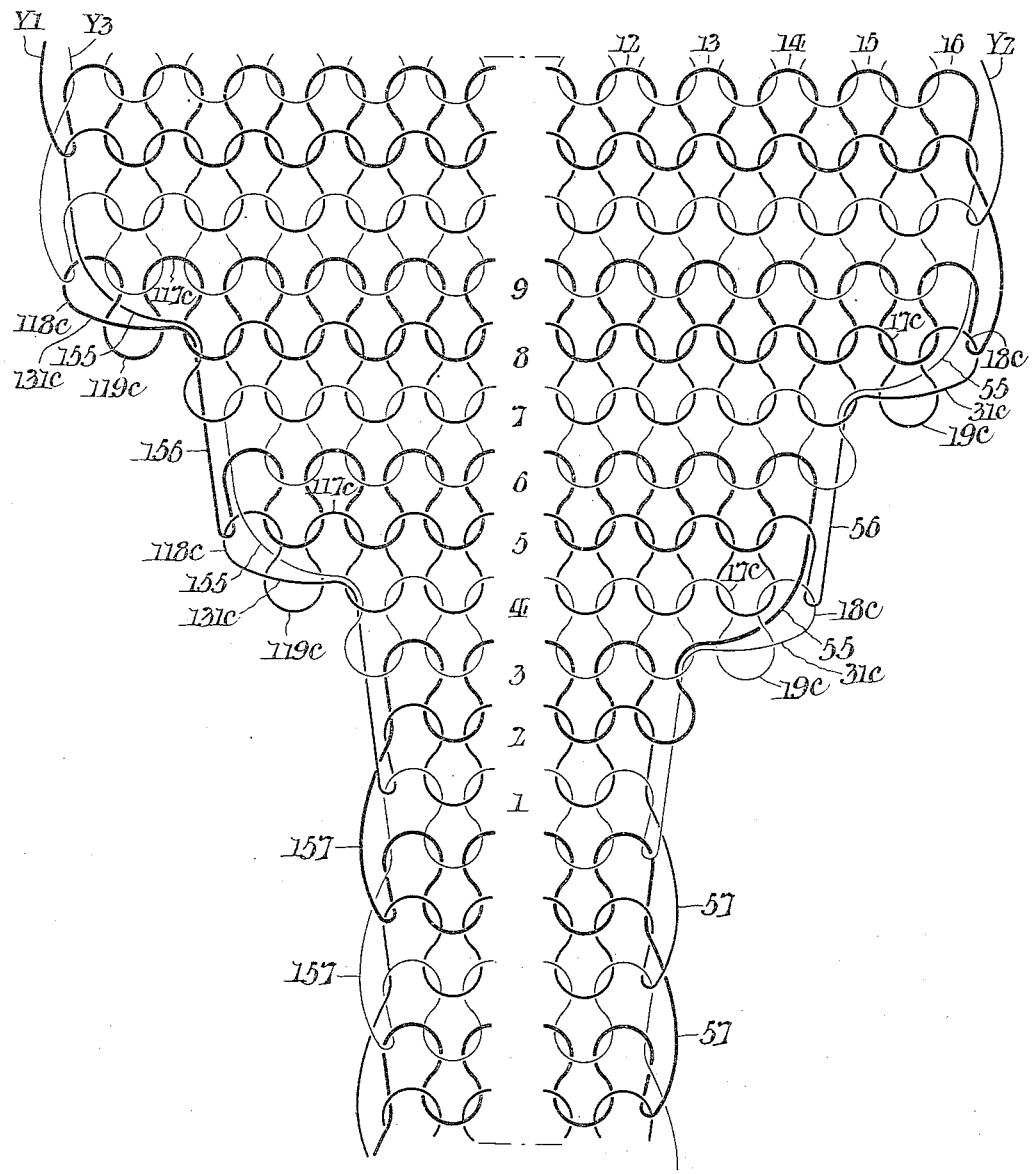
Fig. 39 is a view in turn like Fig. 2 but showing plain three thread or ringless widened fabric produced in accordance with my invention with widenings effected during knitting phases of the machine.

The stocking blank of Fig. 1 may be knitted in the usual way with a uniform width ankle A to a line B—B', whereupon the fabric is progressively widened until a line C—C' is reached, the selvages resulting from the widenings along the lines B—B' C—C' being of the character shown in Fig. 2. After the completion of the fabric to the line C—C' a few unwidened or uniform width courses are preferably knit to the line D—D' and the fabric progressively narrowed thereafter at different rates through E—E' to F—F' and then again narrowed from F—F' to G—G' for more gradual mergence of the resulting lateral heel projections or cheeks H into the parallel sided instep portion I of the foot. The toe T of the stocking may be shaped by narrowing in any approved manner from the line J—J' to the line L—L'. The foot of the stocking blank may moreover be reinforced inward from the edges of the blank, to the dot and dash line R in Fig. 1, to produce the customary cradle effect.

In Figs. 2–17, certain courses of the fabric are numbered 1—9, while certain wales are numbered 10—16, the courses 4 and 8 being widened in each instance by the addition of two loops respectively designated 17 and 18. The fabric shown in Fig. 2 is knitted from a single yarn Y; and it will be noted that the selvage loops 18 at the ends of the widened courses 4 and 8 are twisted and locked by passage of the yarn through the sinker wale loops 19 between said selvage loops and the next adjacent loops 17 in said courses as a consequence of which the wales 13 and 15 are secured against ravelling. The widened locked selvage illustrated in Fig. 2 is of known construction, and no claim is made therefor herein, but to the novel manner of producing it which is about to be described.

In Figs. 3–18, sufficient of a flat knitting machine is shown for the ready understanding of my improved method of widened selvage formation, certain of the needles being designated by the letter N with the exponents 10—16 respectively to correspond with the wale numbering in Fig. 2. Cooperating with the needles are sinkers and web holders generally designated by the letters S and D and numbered to correspond to the needles with which they are respectively associated. The traversing carrier for the yarn Y is designated 20, and at K in Figs. 4 and 10 is shown one of the knockovers of the machine. In Fig. 3 the carrier 20 has come to rest above the divider D13 as shown in full lines after having moved rightward to lay its yarn Y, the sinkers and dividers being retracted, and the needles descending in a knitting phase of the machine to draw the pre-sunk loops of course 3 through the loops of the previous course 2 resting on the knockovers. At the moment when the needles in their descent reach the position shown in Fig. 4, the carrier 20 is shifted outward to the extent of two needles to the position shown in dot and dash lines in Fig. 3, and in full lines in Fig. 5, whereby the yarn Y is laid across the top of the ends of the divider D13 and the sinker S14. This is immediately followed by the advance of the sinkers and dividers as shown in Figs. 6 and 7 while the needles are still down, with the result that the yarn Y is displaced in the form of a bight 21 to the back of the needle N14 by the divider D13 and sinker S14 as shown in Figs. 6 and 7. Accordingly with the ensuing rise of the needles, the needle N14 will come up in front of the displaced bight 21 of the yarn as shown in Fig. 8. Fig. 9 shows the completion of the course 3 with the needles down and the sinkers and dividers retracted, the bight 21 of the yarn having dropped off the divider D13 and the sinker S14 down to the knock-over level as shown in Fig. 10 so that as the sinkers and dividers again advance, the divider D13 and sinker S14 will pass over the top of said bight as shown in Figs. 11 and 12. Fig. 13 show the yarn carrier in its succeeding traverse toward the left with the sinkers and dividers retracted and the needles up. Due to the placement of the bight 21 of the yarn below the divider D13 and the sinker S14 as above explained in connection with Figs. 11 and 12, it will be seen that when the travel of the carrier 20 is reversed, the yarn will be wrapped about the end of the sinker S14 and so held as the carrier completes its leftward traverse. Fig. 15 shows the yarn carrier 20 as having completed its leftward traverse, with the sinkers and dividers advanced and the newly laid yarn sunk around the shanks of the needles, which latter are still in raised position. Fig. 16 shows the sinkers fully retracted with the needles elevated at the completion of the course 4. In being released from the sinker S14, the bight 21 of the yarn takes the form of the twisted selvage loop 18 shown in Fig. 16. In Fig. 17 the yarn carrier has again travelled rightward and is again arrested above the divider D15 but without further increase in its traverse. Fig. 17 also shows the completion of the course 5 with the needles up and sinkers and dividers retracted in readiness for the carrier 20 to move leftward to indicate the formation of course 6. At the course 7 in Fig. 2, the widening operation is again carried out by an additional shift by the distance of two needles of the yarn carrier 20 as described in connection with Fig. 9, with the result that ultimately there is produced the widened course 8 which is exactly like course 4. The widening cycle just described is repeated at intervals during the knitting of the upper portions of the heel cheeks H with interposition between the widened courses of one or more unwidened or uniform width courses such as those designated 5 and 6 in Fig. 2, the number of intermediate unwidened courses depending upon the angle or slope desired in the upper portions of said heel cheeks.

The locking of the selvage loops in each widened course can be effected in a similar manner during narrowing phases of the machine by causing the carrier 20 to be shifted during such phase. Thus, for example, after the completion of course 3 up to the needle N12, the carrier may be given the additional shift at any time that the sinkers are retracted as will be readily understood by those skilled in the performance of Cotton machines.

Fig. 18 illustrates more or less diagrammatically how the delayed outward shifting of the yarn carrier in Fig. 24 may be controlled during ordinary knitting phases of a standard Cotton knitting machine. In this illustration, the numeral 25 indicates the bar for the main yarn carrier 20; 26 the right-hand end rack screw actuated stop nut of the knitting machine; 27 the plating bar (which is usually attached to the slur cock bar, not shown); and 28 the cam on said slur cock bar for actuating the pivoted stop 29 which travels with the stop nut 26 and which cooperates with a stop lug 30 on the yarn carrier bar 25. The cam 28, it will be noted, is shaped somewhat differently from the usual in that it has sloping approaches at opposite sides of a central rise, while the lug 30 on the carrier rod is reversed in position with regard to its bevel. By virtue of the arrangement just described, the yarn carrier bar 25 is temporarily arrested in its rightward travel by action of the cam 28 upon the stop 29 after the movement of said carrier has been checked by the end stop. As the plating bar 27 continues in its rightward travel, the stop 29 is permitted to move back with attendant release of the yarn carrier rod 25, so that the latter is moved by the friction box (not shown) to which it is connected to the end stop 26 before completion of the current couliering stroke. On the succeeding leftward traverse of the main yarn carrier rod 25, the bevel on the lug 30 automatically displaces the stop 29 so that said rod is not interrupted in its travel. It is to be understood that the means shown in Fig. 18 is duplicated at the other end of the machine for the fashioning of the opposite edge of the fabric.

When the narrowing cycle is employed in accordance with my invention, I depend on the usual anti-rebound latch means, by which the carrier bar 25 is temporarily held to the rack screw stop nut of the machine at the end of its stroke, to pull said bar along to the required extent in the widening shift. In working with certain types of yarn, it may be desirable to resort to the narrowing cycle without employing the needle covering points in preference to the knitting cycle to insure the downward displacement of the loops on the needles N10—N12, for example, incident to the formation of course 3, as well as on corresponding needles in the formation of other similar courses of the knitting before the outward shift of the yarn carrier 20 is effected.

In Figs. 19–22 which respectively correspond to Figs. 3–6 I have shown how the locked selvage loops in the widened courses of Fig. 2 may be produced during narrowing phases of the machine with the aid of a narrowing comb of the knitting machine, whereof the points are generally designated by the letter P. In Figs. 19 and 20 it is to be assumed that the points are descending in unison with the needles, and serve no useful purpose except for the outer end point P13 which acts as a barrier to positively insure that the yarn Y will not slip over the top of the needle N13 when the latter reaches the position shown in Fig. 20, and the carrier 20 is shifted from the full line position in Fig. 19 to the dotted line position, i. e., to the position in which it is shown in full lines in Fig. 21. The usual second dip of the narrowing phase is accomplished without lateral shifting of the point comb so that the measured loops on the needles are not transferred as would ordinarily be the case. Before the completion of the narrowing phase, the yarn (Fig. 22) is displaced by the advancing divider D13 and sinker S14 to the back of the needle N14 to form a bight 21' in the same manner as described in connection with Fig. 6. The scheme shown in Figs. 19–22 may be resorted to when exceptionally springy or lively yarns are employed in the knitting.

In the reinforced selvage illustrated in Fig. 23, and in Figs. 24–30 which show successive steps in its formation, the main or body yarn Y is indicated in heavy lines, while the additional or reinforcing yarn is shown in light lines and designated by the letter y. From Fig. 23, it will be further seen that the interloopment of the body yarn Y is exactly the same as in Fig. 2, with twisted selvage loops 18a at the ends of the widened courses 4, 8, and with the yarn passing through sinker wale loops 19a which connect said end needle loops with the adjacent loops 17a in said widened courses. The loops of the reinforcing yarn y are doubled with those of the main yarn Y in the reinforced fabric except at the ends of the widened courses 4 and 8, where end loops 31 which result in each instance from the ravelling of two free loops 32 and 33 shown in dotted lines in Fig. 23 measured off during the knitting as will be presently explained. The formation of the locked selvage loops in the widened courses of the fabric of Fig. 23 during knitting phases of the machine is briefly as follows: in Fig. 24 it is to be understood that the right-hand end stop (not shown) of the machine has been shifted outward by the distance of two needles and the carrier 40, by virtue of being latched thereto, has been correspondingly shifted to a rest position over the divider D15 after having traversed to the right to lay the reinforcing yarn y. It is to be further understood that the carrier 20 has been temporarily arrested over the divider D13 after having laid the main yarn Y; and that the needles are in fully elevated position with the sinkers and dividers fully retracted in a knitting phase of the machine. In Fig. 25 it is to be assumed that the sinkers and dividers are fully retracted after having sunk both yarns on the needles up to the needle N12, and loops 32 and 33 of the reinforcing yarn y alone on the added end needles. It is to be further understood in Fig. 25 that the needles have descended to the level shown in Fig. 4 and that at that moment the main yarn carrier 20 is released and shifted further rightward incident to the completion of the current couliering stroke into line with the reinforcing carrier 40 over divider D15 as shown in broken lines, the main yarn Y being thereby laid over the ends of the divider D13 and sinker S14. Fig. 26 shows the culmination of the last described operation with the course 3 completely formed and its loops (including the extra end loops 32 and 33 of the reinforcing yarn y) at the knock-over level. Fig. 27 shows the next stage in the current knitting cycle with the sinkers and dividers projected and with a bight 21a of the main yarn displaced by the divider D13 and sinker S14 rearwardly of the needle N14, so that the latter will come up in front of said bight as in the first described instance during elevation of the needles to complete the current knitting phase of the machine. In Fig. 28, the carriers 20 and 40 have traversed leftward to lay the yarns for the course 4 incident to which both yarns are wrapped about the end of the sinker S14 as at 36 with attendant absorption of the free loops 32 and 33 of the reinforcing yarn. Fig. 29 shows the completion of course 4 with the twisted end loop 18a on the needle 14 and the float loop 31 of the reinforcing yarn freed from the sinker S14 and the widening cycle consummated. Courses 5 and 6 in Fig. 23 are formed without change in the rightward travel of the yarn carriers. Courses 7 and 8, on the other hand, are formed by repetition of the widening cycle above described in connection with courses 3 and 4. Fig. 30 is like Fig. 25, and shows the set up in the formation of course 9 in Fig. 23.

To form the widened courses with the locked selvage loops in Fig. 23 after the manner just described in connection with Figs. 24–30 incident to ordinary knitting cycles, the machine is arranged as shown in Fig. 31 which is like Fig. 18 except that it shows the supporting rod 41 for the reinforcing yarn carrier 40. The position of the carriers 20 and 40 in Fig. 31 corresponds to that shown in Fig. 25, the rightward stroke of the reinforcing yarn carrier 40 having been terminated by abutment of its rod against the carrier nut stop 26, and the main yarn carrier 40 temporarily arrested by engagement of the lug 30 on its supporting bar 25 with the pivoted stop 29. Before the current couliering stroke is completed, the pivoted stop 29 will be retracted as soon as the central projection of the cam 28 on the plating bar 27 has passed beyond it with attendant release of the main yarn carrier bar 25 and outward shifting of the carrier 20 into line with the reinforcing yarn carrier 40 as in Fig. 26. Due to the temporary arresting influence of the stop 29 upon the main yarn carrier 20, loops of the reinforcing yarn will be formed only on the two endmost needles during the production of straight edged selvages as instanced at 42 and 43 in Figs. 24–30 in alternate courses of the knitting; whereas in the other courses, loops 46 and 47 of the main yarn will be doubled on such endmost needles with loops 48 and 49 of the reinforcing yarn, with floats 50 of said main yarn extending in each instance diagonally across the loops 42 and 43 of the reinforcing yarn. Due to the last described characteristic, selvages produced according to my invention are less apt to curl than when made as ordinarily with the reinforcing yarn extending to the very end loops at the fabric edges in each course of the knitting. This advantage is important in flat stocking fabrics made from lively yarns in connection with which excessive edge curling renders seaming slow and difficult of accomplishment.

The reinforced fabric shown in Fig. 32 is likewise produced from a main Y and a reinforcing or plating yarn y, but with locked selvage loops in the widened courses formed during narrowing phases of the knitting machine. Here, in the widened courses 4 and 8, it will be observed that the added end needle wale loops as well as the connecting sinker wale loops are formed from both yarns. In other words, loops 52, 53 and 54 of the reinforcing yarn y are doubled with the added end needle and sinker wale loops 17b, 18b and 19b. Also as shown, the end selvage loops in the uniform width portions of the fabric of Fig. 32 are in this instance formed from both yarns Y and y. The fabric of Fig. 32 results from the steps shown in Figs. 33–38. In Fig. 33, the course 3 has just been completed after traverse of the carriers 20 and 40 to the right to rest position over the divider D13, the sinkers and dividers being retracted, the needles being elevated, and said course lying at the knock-over level. The machine is thereupon caused to go into a narrowing phase and then immediately in the first dip of the narrowing phase, or at a somewhat later time but while the sinkers and dividers are still retracted, the yarn carriers 20 and 40 are simultaneously moved outward (rightward) by the distance of two needles to a position over the divider D15 as shown in Fig. 34. Such shifting is accomplished through a reverse rotative movement of the screw of the narrowing head of the machine and as a result of the coupling of the carriers to the narrowing head nut by the usual anti-rebound latches in a manner already understood. As a consequence, both threads Y and y are laid over the ends of the divider D13 and sinker S14 as is also shown in Fig. 34. Fig. 35 shows the next step during the narrowing phase in which the sinkers and dividers are advanced while the needles are down with attendant displacement of bights 21b and 51 of the threads Y and y rearweard of the needle N14. In Fig. 36, the sinkers and dividers are shown as having been retracted with the yarn bights 21b and 51 at the sinker level below the ends of the divider D13 and the sinker S14 at the end of the narrowing phase. In Fig. 37 the yarns Y and y are being laid leftward in preparation for the drawing of the widened course 4 in the succeeding knitting phase, incident to which laying both said yarns are wrapped about the end of sinker S14, with consequent formation, upon completion of said course as in Fig. 38, of the doubled twisted end wale loops 18b and 53 on the needle N14. Course 8 and all succeeding widened courses of the fabric of Fig. 32 are produced in precisely the same manner.

The plain (non-reinforced) ringless fabric of Fig. 39 is produced from three yarns Y', Y2 and Y3 of the same kind and count used in alternation and in a constantly repeating sequence throughout the knitting. Due to the alternate use of the yarns in the manner characteristic of ringless knitting, floats of the idle yarns are formed at the widened selvages as well as in other portions of the fabric. As in the fabric of Fig. 2, the right-hand selvage loops 18c in the widened courses 4 and 8 are twisted. In each instance, however, the locking is effected here not by passage of the yarn from which the loop 18c is formed through the immediately adjacent sinker wale loop 19c, but by passage through the latter loop as well as through selvage loops of a float of one of the other yarns. Thus at the right-hand edge of the fabric in Fig. 39, a float 55 of the yarn Y' extends from the terminus of course 3 through the loops 19c and 18c to the end loop of the course 6, the float 31c of the yarn Y3 at the course 3 being free of the locked selvage loop 18c of the widened course 4. As also shown, a float 56 of the yarn Y2 extends from the right-hand end loop of course 5 to the point of its re-introduction in course 8 where a locked selvage loop 18c is formed therefrom. The formation of the locked selvages in the widened courses at the opposite or left-hand edge of the fabric will of course be identical to that described of the right-hand side edge, and the corresponding loop elements have therefore been identified with corresponding numerals raised by 100. It is to be noted, in this instance that the floats 57 at the opposite selvage edges of the uniform width portion of the fabric are as usual.

The locked selvage loops in the widened courses of the fabric of Fig. 39 are formed during ordinary knitting phases of the machine in the manner about to be described with reference to Figs. 40-53 wherein the carriers for the three yarns Y', Y2 and Y3 are designated 61, 62 and 63 respectively. In Fig. 40 it is to be understood that the carrier 61 is temporarily arrested over the divider D13 after having laid its yarn Y' rightward for the course 3; that the sinkers and dividers have just been withdrawn after sinking said yarn, and that the needles have been depressed in the current knitting phase to the level shown in Fig. 4. It is also to be understood in Fig. 40 that during a previous outward shift of the right-hand end stop (not shown) of the machine to the extent of two additional needles, the carrier 63, by virtue of being latched to said nut, was moved correspondingly outward to a rest position over the divider D15 as a consequence of which loops 64 and 65 of its thread Y3 were sunk on the needles N13 and N14. In Fig. 41, the sinkers and dividers are fully retracted and it is to be understood that the needles are all the way down with the loops of the yarn Y', as well as those of the yarn Y3, lying at the knock-over level; and that the carrier 61 has just been shifted outward into line with the carrier 63 in the way described in connection with Fig. 25 incident to the completion of the current couliering stroke, the extended length of the yarn Y' having been thus laid over the ends of the divider 13 and the sinker 14.

Figure 52:
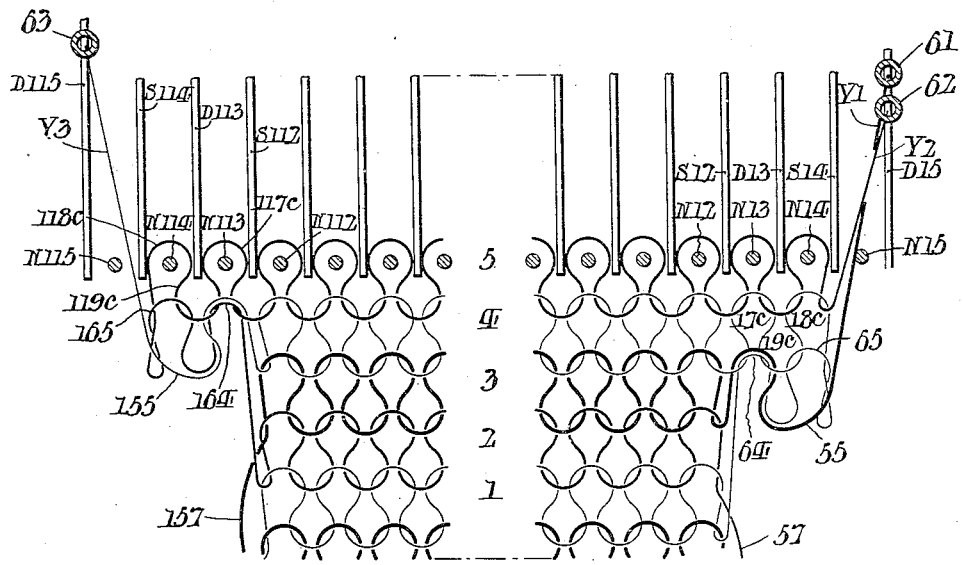
Figure 53:
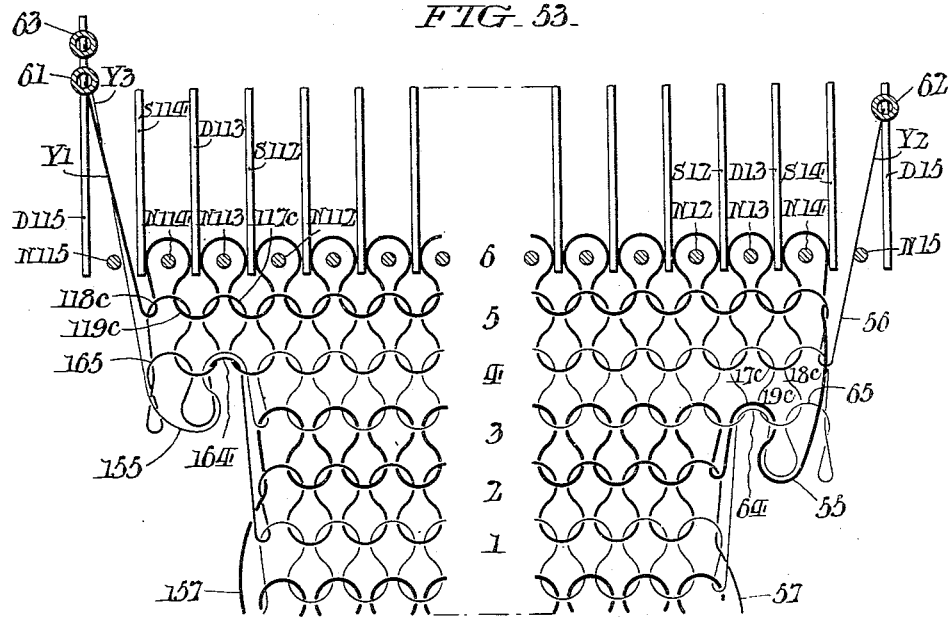

Fig. 42 shows the sinkers and dividers fully projected with the extended length of the yarn Y' displaced by the divider D13 and sinker S14, the needles being all the way down with the needle N14 behind the displaced yarn bight. It will also be seen from Fig. 42 that all the previously sunken loops of the yarn Y' as well as the two end loops 64, 65 of the yarn Y3 are all at the knock-over level, i. e., below the sinkers and dividers, while the extended bight 55 of the yarn Y' is supported on the ends of the divider 13 and sinker 14. Fig. 43 shows conditions at the completion of the current knitting cycle with the sinkers and dividers fully retracted, at which time the needles are fully elevated, the bight 55 of the yarn Y' being released from the divider D13 and the sinker S14 and having dropped to the knock-over level. In Fig. 44 the same conditions obtain as in Fig. 43 except that the left-hand end nut (not shown) of the machine has been shifted outwardly and moved the carrier 62 to rest position over the divider D115, with the resultant extended length of the yarn Y2 lying over the ends of the divider D113 and the sinker S114. Also in Fig. 44 the carrier 63 has been temporarily brought to rest over the divider D113 after having been moved leftward to lay its yarn Y3 in preparation for the formation of the course 4, said yarn having incidentally been wrapped around the sinker S14 as shown at 66. In Fig. 45, the sinkers and dividers have been advanced to sink the yarn Y3 laid as just described. In Fig. 46 it is to be understood that the needles have again been lowered to the level shown in Fig. 40, the sinkers and dividers being in retracted position. At this moment, the carrier 63 is released, and during the completion of the current couliering stroke of the machine, brought into line with the carrier 62 over the divider D115 as shown in Fig. 47, the course 3 having in the meantime been cast and the loops of the new course 4 of the yarn Y3 together with the added loops 164c and 165c of the yarn Y2 on the needles N113 and N114 having been brought down to the knock-over level. In Fig. 48 the sinkers and dividers are in projected position, the divider D113 and the sinker S114 having displaced the extended portion of the yarn Y3 rearwardly of the needle N114. Fig. 49 shows the completion of the current knitting phase of the machine with the course 4 fully formed, the sinkers and dividers fully retracted with the bight 155 of the yarn released from the ends of the divider D113 and sinker S114 and lying at the knock-over level, and the needles elevated in readiness for the formation of the next course of the knitting. In Fig. 50 the carrier 62 is shown as having traversed to the right and has come to rest over the divider D15 after laying the yarn Y3, said yarn having been incidentally wrapped about the end of the sinker S14 as shown at 166. In Fig. 51 the sinkers and dividers have been advanced to sink the yarn Y2 newly laid in Fig. 50 for course 5. In Fig. 52 the course 5 is shown as having been cast, the needles being up, the dividers and sinkers retracted in preparation for the formation of the next course 6 of the knitting; while Fig. 53 shows conditions after the formation and completion of the latter course from the yarn Y'. Thus, by repetitions of the immediately foregoing procedure, it will be seen that, through my invention, it is possible to produce plain three thread ringless fabric with widened selvages wherein the end loops are positively locked against ravelling. In the fabric of Fig. 39, the segment floats at 31c and 131c result from the ravelling of the free loops 64, 65 and 164, 165 as the fabric is pulled endwise from the needles during the knitting.

Figure 54:
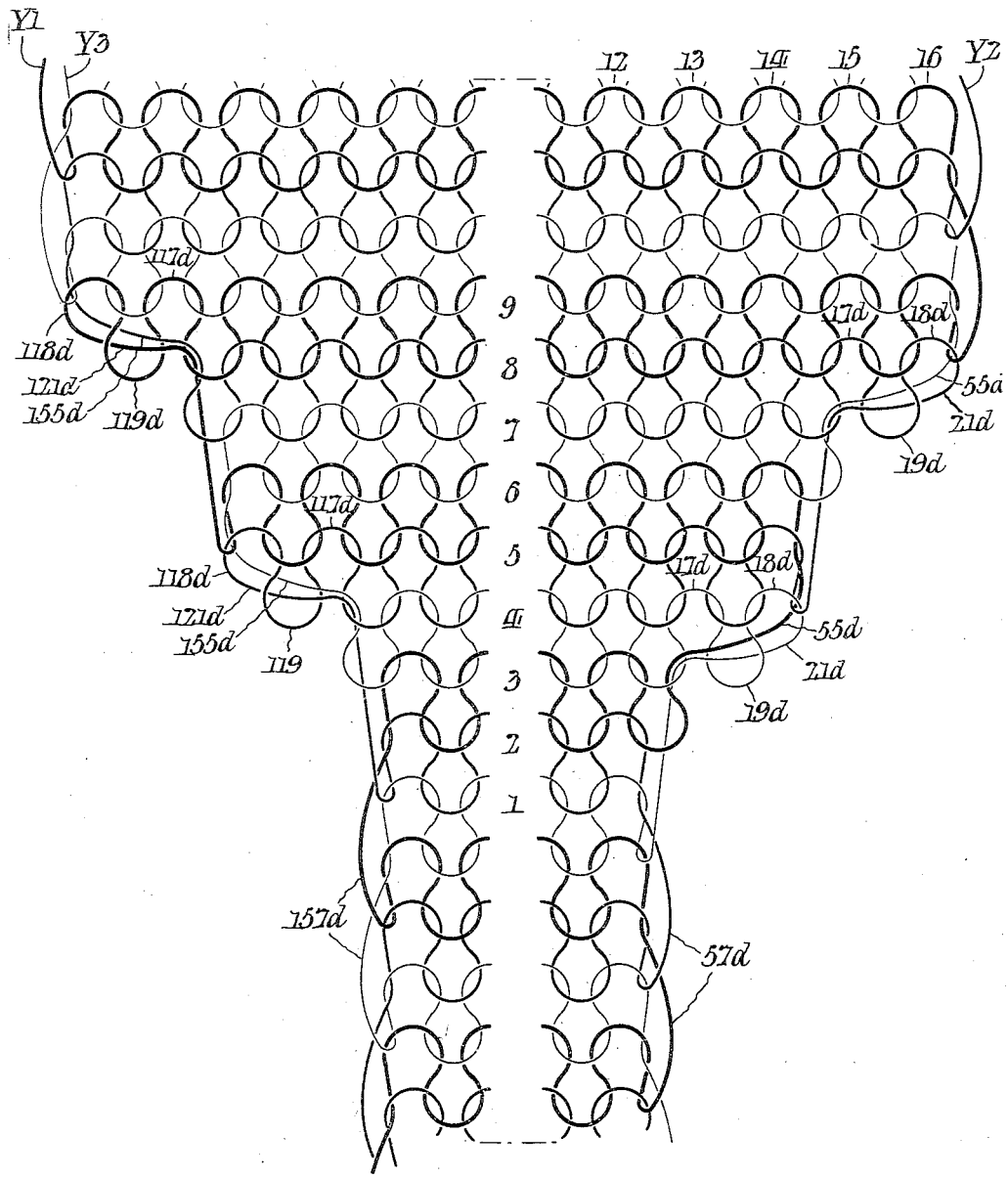
Fig. 54 is a view also like Fig. 2 but showing three thread or ringless widened fabric in which the widenings are effected during narrowing phases of the machine.

Fig. 54 shows widened unreinforced ringless fabric with locked selvage loops formed in the widened courses in accordance with my invention during narrowing phases of the machine. Here, in each widened course, and as exemplified in course 4, floats 21d and 55d of two of the threads Y' and Y3 used in the knitting pass through the sinker wale loop 19d which connects the twisted selvage needle wale loop 18d and the immediately neighboring loop 17d formed from one of the two threads, to wit, the thread Y3. In other respects, it will be observed that the fabric of Fig. 54 is like that of Fig. 39 and the method of its production will now be described by reference to Figs. 55–65.

Figure 64:
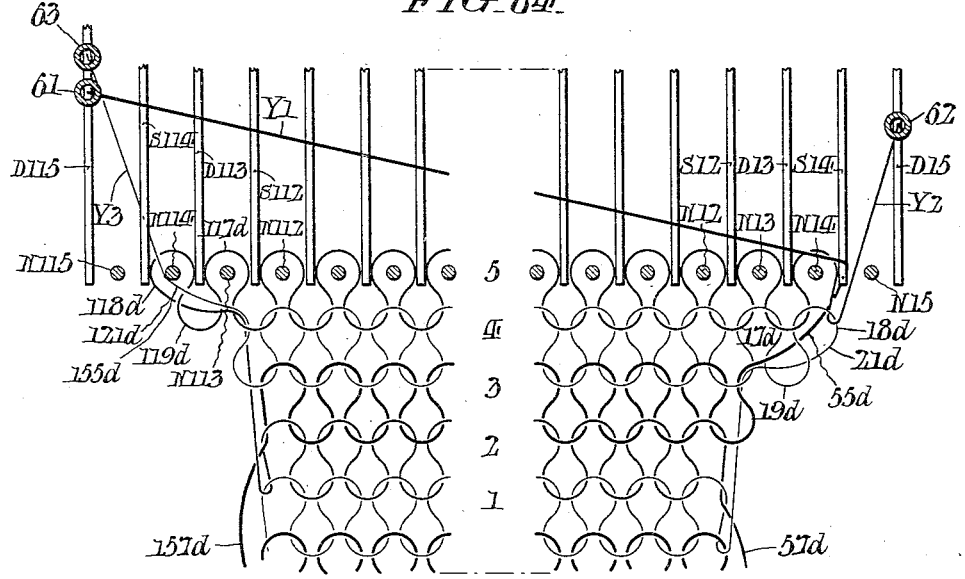
Figure 65:
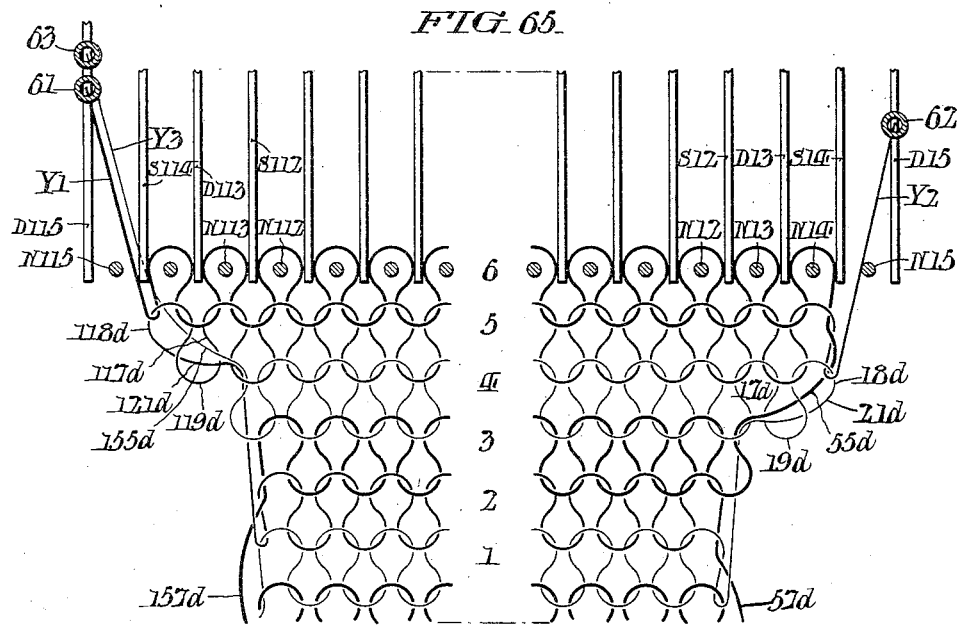

In Fig. 55, the carrier 61 is at rest over the divider D13 after having laid the yarn Y' which has already been sunk by the sinkers and dividers which are in retracted position. In connection with Fig. 55 it is to be assumed that the needles are descending in a knitting phase, and are about to draw the loops of the yarn Y3 off the ends of the sinkers and dividers down to the knock-over level. Upon completion of the course 3 from the yarn Y' with the sinkers and dividers fully retracted and the needles all the way up at the finish of the knitting phase as shown in Fig. 56, the machine is caused to go into a narrowing phase. At the initiation of the narrowing phase the right-hand stop nut of the machine is shifted outwardly by the distance of two needles, and the carrier 61 together with the previously idled carrier 63, due to their being latched to said nut, are simultaneously shifted to rest position over the divider D15. As the sinkers and dividers are projected at a time when the needles are down during the first dip of the narrowing phase, the extended lengths of the yarns Y' and Y3 are displaced as bights 21d and 55d to the rear of the needle N14 as shown in Fig. 57, so that as the needles subsequently rise, said needle will come up within said bights. Fig. 58 shows conditions after the completion of the current narrowing phase with the sinkers and dividers fully retracted and the yarn bights 21d and 55d free of the divider D13 and sinker S14 and lying at the knock-over level with the loops of the course 3, it being understood that the needles are all elevated at this time in readiness for the laying of yarn for the next course 4. In Fig. 59 the carrier 63 next in order has traversed leftward in the act of laying the yarn Y3 for the course 4, said yarn being incidentally wrapped around the sinker S14 as shown at 36d. Fig. 60 illustrates the stage in the formation of the course 4 at a time when in the knitting cycle the loops of said course are about to be drawn off the ends of the sinkers and dividers by the descending needles, the carrier 63 having come to rest over the divider D113 in line with the previously idled carrier 62. Fig. 61 is a view like Fig. 57 showing an advanced stage in the succeeding narrowing phase after simultaneous outward (leftward) shifting of the carriers 62 and 63, with the extended lengths of the yarns Y2 and Y3 displaced as at 121d and 155d rearwardly of the needle N114. In connection with Fig. 61, it will be noted that the drawing of the course 4 resulted in the formation of the twisted selvage loop at 18d and in the passage of both the yarns Y' and Y3 through the sinker wale loop at 19d. Fig. 62 shows the carrier 62 next in order as having completed a rightward traverse and at rest over the divider D15 with the previously idled carrier 61, after having laid its yarn Y2 for the course 5 of the fabric. Fig. 62 further shows the yarn Y2 as having been wrapped about the end of the sinker S114, the bights of the yarns Y2 and Y3 lying at this time at the knock-over level. In Fig. 63, the course 5 is completed with a twisted selvage loop 118d of the yarn Y2 on the needle N114 and with both said yarn and the yarn Y3 extending through the sinker wale loop 119d. Fig. 64 shows the carrier 61 next in order as having completed a leftward traverse in the succeeding knitting cycle and at rest over the divider D115 with the previously idled carrier 63 after having laid its yarn Y' for the course 6, said yarn having incidentally been wrapped about the sinker S14. Fig. 65 shows the completion of the course 6 from the yarn Y'.

Figure 66:
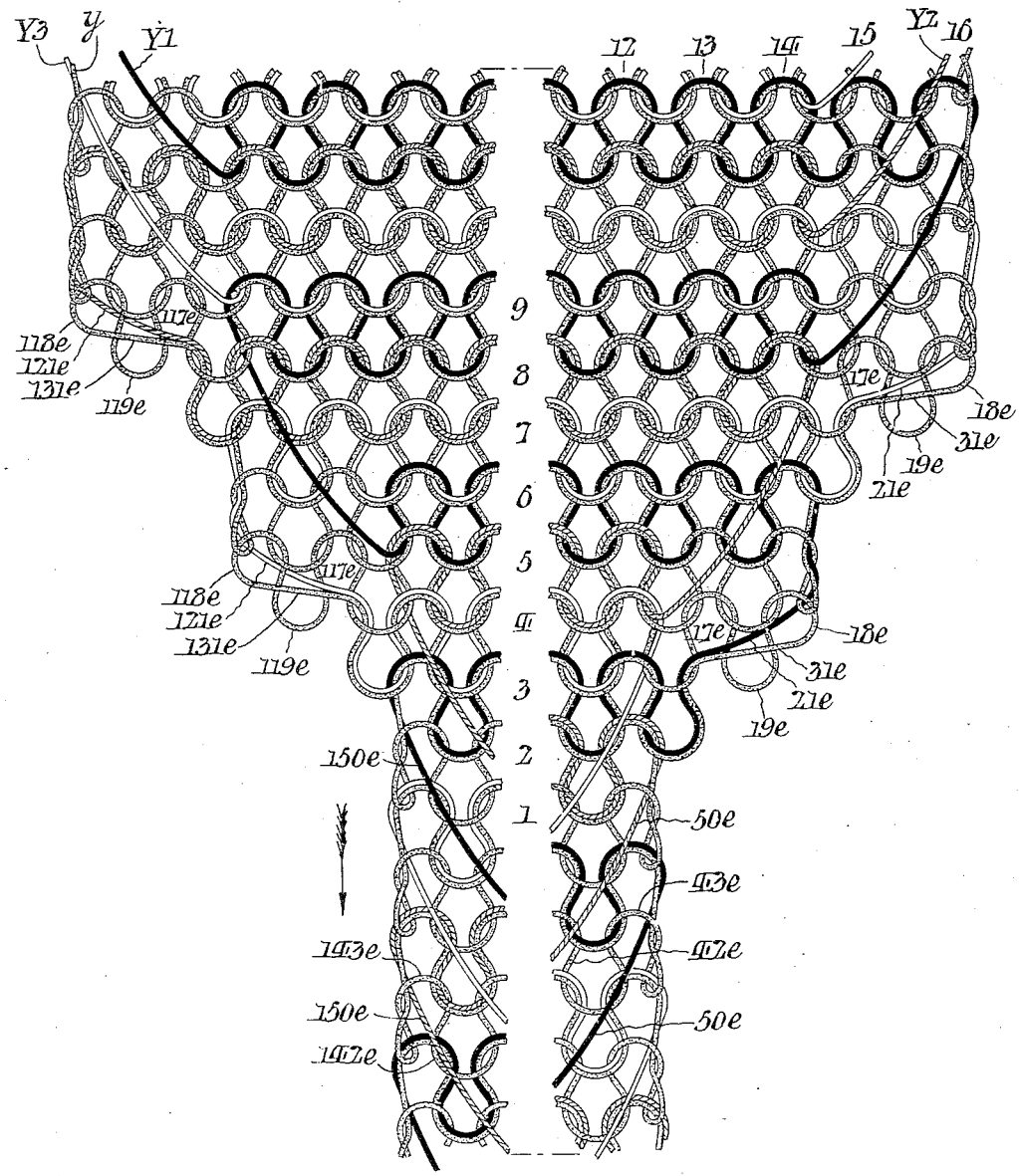
Fig. 66 shows three thread or ringless reinforced widened fabric in which widenings are effected during knitting phases of the machine.

In Fig. 66 which diagrammatically shows a reinforced widened ringless fabric with locked selvage loops in the widened courses made in accordance with my invention during knitting phases of the machine, the three main or body yarns are designated as before by the characters Y', Y2 and Y3, and for the purposes of more ready distinction are respectively shown as solid, cross-hatched and open, while the auxiliary or reinforcing yarn y is stippled. Here, as in the fabric of Fig. 39, the yarn from which the selvage loops in the widened courses are formed does not pass through the adjacent sinker wale loops, which are however locked by passage through them, in each instance, of one of the other yarns. Thus in widened course 4, for example, the portion 31e of the reinforcing yarn y from which the selvage loop 18e is formed does not go through the adjacent sinker wale loop, while on the other hand the latter loop is penetrated by the yarn Y as at 21e and thus locked thereby. The fabric of Fig. 39 moreover resembles the reinforced fabric illustrated in Fig. 23 by reason of having floats 50e of the main yarns inward of the edges of its parallel edged portions, and edge loops 42e, 43e and 142e, 143e in alternate courses of such portions formed from the reinforcing yarn alone.

In Figs. 67–77 which illustrate successive steps in the formation of the fabric of Fig. 66, the three main yarns Y', Y2 and Y3 have been diagrammatically indicated by lines of varying thicknesses and the reinforcing yarn y by a broken or dotted line. In Fig. 67, the machine is performing a knitting cycle, the sinkers and dividers being retracted, the carrier 61 having traversed from left to right and having been temporarily arrested over the divider D13 in line with the previously idled carrier 63, and the carrier 40 for the reinforcing yarn having been moved outwardly to the right to the extent of two extra needles and having come to rest over the divider D15 during the current couliering stroke which is not yet completed. It is to be assumed in Fig. 67 that the needles have been depressed to the point where they are about to draw the loops of course 3 from the yarn Y' with the added end loops 32e, 33e of the reinforcing yarn y on the needles N13, N14 off the ends of said sinkers and dividers and to carry them to the knock-over level. At the moment when the needles are at the level just referred to or as shown in Fig. 4, the main yarn carrier 61 is moved rightward at the completion of the current couliering stroke into line with the reinforcing yarn carrier 40 as shown in Fig. 68, in which latter the course 3 is completed and is now lying at the knock-over level with the single loops 32e, 33e of the reinforcing yarn y. By the immediately ensuing projection of the sinkers and dividers before the needles rise, a bight 21e of the main yarn Y' is displaced rearwardly of the needle N14 as shown in Fig. 69 over the single added end loops of the reinforcing yarn y, so that when the needles rise, said needle N14 will come up in front of said bight. This stage is shown in Fig. 70 in which it is to be understood that the needles are fully elevated and the sinkers and dividers fully retracted at the end of the current knitting phase, the yarn bight 21e having been released and dropped to the knock-over level. Fig. 71 shows the yarn carrier 63 next in order as having been moved to the left concurrently with the reinforcing yarn carrier 40 with attendant laying of the yarns Y3 and y in preparation for the formation of the next course 4, the active main yarn carrier 63 having been temporarily arrested over the divider D113 in line with the previously idled main yarn carrier 62, but the reinforcing carrier advance to rest over the divider D115. Incident to the leftward traverse of the carriers 63 and 40 it will been seen from Fig 71 that the main yarn Y3 was wrapped around the sinker S12 and the reinforcing yarn around the end of the sinker S14. Fig. 72 shows an intermediate step in the current knitting phase in which the needles are to be assumed to be descending with the sinkers and dividers advancing to sink the yarns Y3 and y with incidental formation of loops 132e and 133e of the latter yarn alone on needles N113 and N114. Fig. 73 shows a further step in the current knitting phase after leftward shifting of the main yarn carrier 63 into line with the reinforcing carrier 40 over the divider D115, and with the sinkers and dividers retracted and an extended length of the yarn Y3 overlying the ends of the divider D113 and sinker S114. Fig. 74 shows a more advanced step in the current knitting phase with the sinkers and dividers projected over the fabric and the added length of the yarn Y3 displaced as a bight 121e rearwardly of the needle D114, it being understood that the needles are all still depressed at this time. In Fig. 75 the sinker and dividers are all retracted at the completion of the current knitting phase with the yarn bight 121e lying at the knock-over level with the loops of the course 4, it being understood that the needles are at this time in fully elevated position. Fig. 76 shows the first step in the next knitting phase after rightward traverse of the reinforcing carrier 40 to rest position over the divider D15 and the carrier 62 next in order temporarily arrested over the divider D13 after concurrent traverse rightward, with the yarns Y2 and y laid in readiness for the next course 5 and respectively wrapped around the ends of the sinker S114 and divider D113. Fig. 77 shows an advanced stage in the current knitting phase with the course 5 formed and lying at the knock-over level, the sinkers and dividers retracted, the carrier moved rightward into line with the carriers 61 and 40 over the divider D15, and an added length of the yarn Y2 laid over the ends of the divider D13 and sinker S15, it being understood that at this stage the needles are still depressed. The step shown in Fig. 77 will obviously be followed by displacement of a bight 21e of the yarn Y2 rearward of the needle N14 and upward passage of said needle within such bight as the current knitting phase is completed in exactly the same way as described in connection with the completion of course 3 in Fig. 70. The floats in the parallel edged portions of the fabric result from the temporary arresting of the main yarn carriers as the shifts of the reinforcing yarn carrier are continued incident to the knitting of the individual courses of said portions.

In the reinforced widened ringless fabric of Fig. 73, the locked selvage loops at the ends of the widened courses 4 and 8 are formed during narrowing phases of the machine by following the procedure described in connection with Figs. 34–38 with incidental control of the reinforcing yarn carrier in the manner described in connection with Fig. 31. Accordingly, loops of the reinforcing yarn y are doubled with loops of one or the other of the main or body yarns Y'—Y3 throughout the several courses substantially as in the plain reinforced fabric of Fig. 32. Also as a consequence, portions respectively of one of the body yarns and the reinforcing yarn y pass, in each instance, through the sinker wale connecting the adjacent end needle wale loops of the widened courses. Thus, as exemplified in course 4, a segment 21f of the body yarn Y' and a segment 51f of the reinforcing yarn y both pass through the double sinker wale loop 19f which connects the two double end needle wale loops 17f and 18f of both said yarns. Here, again due to the alternate use of the main or body yarns in the knitting, floats 56f and 57f of said yarns occur at the selvages in the intervals between the courses in which they are respectively used. The important feature to be noted here is that the end loops in the widened courses are locked as in all the other previously described embodiments of my invention.

It is to be understood that my invention is not necessarily confined to the widening of fabric for stockings as herein described for convenience of exemplification, but that it may be used in other instances where widening is advantageous to shape knitted fabrics for purposes other than stockings.

Having thus described my invention, I claim:

1. The method of widening incident to production of fabric on a flat knitting machine having a series of needles, cooperative sinkers and knockovers, and a traversing yarn carrier, by repetitions of a cycle which includes moving the carrier to lay yarn across a definite number of needles and causing the needles to descend to form a course of loops while the carrier rests at the end of its traverse; thereupon shifting the carrier outward in the same direction by a distance of one or more needles at a time when the sinkers are retracted to lay the yarn across the ends of the sinkers associated with the added needles; then, at a time when the needles are depressed, causing the sinkers to be projected to effect displacement of the extra yarn as a bight to the rear of the endmost of the added needles by the sinkers at opposite sides of such needle; and finally causing the needles to be elevated so that the endmost needle will come up within the displaced yarn bight.

2. The method of widening incident to production of fabric on a flat knitting machine having a series of needles and cooperative sinkers, and a traversing yarn carrier, by repetitions of a cycle which involves moving the carrier to lay the yarn across a definite number of needles in a knitting cycle of the machine, then while the carrier is resting at the end of its traverse with the sinkers retracted after the formation of a course of loops from said yarn, causing the yarn carrier to be shifted outward by the distance of one or more needles to a new stop position to lay the yarn over the ends of the sinkers associated with the added needle or needles, so that upon ensuing projection of the sinkers while the needles are still down, a bight of the yarn is displaced to the rear of the endmost added needle by the sinkers at opposite sides thereof, and so that as the needles subsequently rise at the completion of the knitting phase, said endmost needle will come up within said bight.

3. The method of widening incident to production of fabric on a flat knitting machine having a series of needles and cooperative sinkers, and a traversing yarn carrier, by repetitions of a cycle which involves moving the carrier to lay the yarn across a definite number of needles and causing a course of loops from the newly laid yarn in a knitting phase of the machine; and then causing the machine to go into a narrowing phase and at a time when the sinkers are retracted, shifting the carrier outward in the direction it was moved in the knitting phase by the distance of one or more needles to lay the yarn over the ends of the sinkers associated with the added end needles so that eventually at a later time in the narrowing phase when the needles are depressed and the sinkers are projected, an extended length of yarn will be displaced as a bight rearward of the endmost added needle by the sinkers at the opposite sides thereof, and so that finally at a time when the needles rise in the narrowing phase, said endmost needle will come up within said bight.

4. The method of widening incident to production of fabric on a flat knitting machine having a series of spring beard needles and cooperative sinkers, a needle beard closing point and a traversing yarn carrier, by repetitions of a cycle which involves moving the carrier to lay its yarn and arresting it after a definite number of needles are fed; thereupon causing the needles to descend with the beard closing point in contact with a needle outward beyond the last needle fed, and when the needles have descended substantially to the knock-over level with the sinkers retracted after the formation of a course of loops from the yarn, causing the carrier to be shifted outward to a position past the needle beyond the covered needle to lay the yarn over the ends of the sinkers associated with the added end needles; then at a time when the needles are depressed causing the sinkers to be projected so that the extended length of the yarn will be displaced as a bight rearward of the endmost added needle by the sinkers at opposite sides thereof; and finally causing the needles to rise so that said endmost needle will come up within said bight.

5. The method of widening incident to production of reinforced fabric on a flat knitting machine having a series of needles and cooperative sinkers, and traversing main and auxiliary yarn carriers, by repetitions of a cycle which involves moving the two carriers concurrently to lay the yarns and temporarily arresting the main yarn carrier after feeding of a definite number of the needles while allowing the auxiliary carrier to continue to the extent of one or more additional needles; then at a time when the sinkers are retracted after having sunk the newly laid yarns and the new course of loops is formed, shifting the main yarn carrier outward into line with the auxiliary carrier to lay its yarn over the ends of the sinkers associated with the added end needles; then at a time when the needles are depressed, causing the sinkers to be projected so that the extended length of the main yarn will be displaced as a bight rearward of the endmost added needle by the sinkers at opposite sides thereof; and finally causing the needles to rise so that said endmost needle will come up within said bight.

6. The method of widening incident to production of reinforced fabric on a flat knitting machine having a series of needles and cooperative sinkers, and traversing main and auxiliary yarn carriers, by repetitions of a cycle, which involves moving the two carriers concurrently to lay the yarns and temporarily arresting the main yarn carrier after feeding of a definite number of the needles in a knitting phase of the machine while allowing the auxiliary carrier to continue in its movement to the extent of one or more additional needles; and then at a time while the sinkers are retracted after having sunk the newly laid yarns and the new course is formed, causing the main yarn carrier to be shifted outward into line with the reinforcing yarn carrier to lay its yarn over the ends of the sinkers associated with the added end needles, so that as the sinkers are projected with the needles fully depressed at an intermediate stage in the knitting phase, the extended length of the main yarn will be displaced as a bight rearward of the endmost added needle by the sinkers at opposite sides thereof, and so that later as the needles rise at the completion of the knitting phase, said endmost needle will come up within said bight.

7. The method of widening incident to the production of reinforced fabric on a flat knitting machine having a series of needles and cooperative sinkers, and traversing carriers respectively for a main and an auxiliary yarn, by repetitions of a cycle which involves during the performance of a knitting phase of the machine, concurrently moving the two carriers to lay their yarns across a definite number of needles; and then causing the machine to go into a narrowing phase and at a time when the sinkers are retracted, concurrently shifting the two carriers outward to the extent of one or more needles in the same direction to lay the yarns over the sinkers associated with the added end needles, so that eventually at a time in the narrowing phase when the needles are depressed and the sinkers are projected, the extended lengths of the main yarn will be displaced as bights rearward of the endmost added needle by the sinkers at opposite sides thereof, and so that finally at a time when the needles rise before completion of the narrowing phase, said endmost needle will come up within said bights.

8. The method of widening incident to the production of reinforced fabric on a flat knitting machine having a series of spring beard needles and cooperative sinkers, a needle beard closing point, and traversing carriers respectively for a main yarn and an auxiliary yarn, by repetitions of a cycle which involves concurrently moving the two carriers to lay their yarns and temporarily arresting the main yarn carrier after feeding of a definite number of the needles; then causing the needles to descend with the beard closing point in contact with a needle outward beyond the last needle fed, and when the needles have descended substantially to the knock-over level with the sinkers retracted after the formation of a course of loops, causing the main yarn carrier to be shifted outward into line with the auxiliary yarn carrier to lay its yarn over the ends of the sinkers associated with the added needles; then at a time when the needles are depressed, causing the sinkers to be projected so that the extended length of the main yarn will be displaced as a bight rearward of the endmost added needle by the sinkers at opposite sides thereof; and finally causing the needles to rise so that said endmost needle will come up within said bight.

9. The method of widening incident to the production of ringless fabric on a flat knitting machine having a series of needles and cooperative sinkers, and a plurality of traversing carriers for individual yarns of the same kind and count used in alternation and in a recurrent sequence, by repetitions of a cycle as each of the yarns is used which cycle involves moving one of the carriers to lay its yarn across a definite number of needles while the other carriers are idled; then with the active yarn carrier resting at the end of its traverse forming a course of loops from the newly laid yarn; then at a time when the needles are substantially at the knock-over level in their descent and the sinkers are retracted, shifting the active yarn carrier outward to the extent of one or more needles to a new stop position to lay its yarn over the ends of the sinkers associated with the added needles; thereupon, at a time when the needles are depressed, causing the sinkers to be projected with attendant displacement of the added length of the yarn as a bight to the rear of the endmost added needles by the sinkers at opposite sides thereof; and finally causing the needles to rise so that the endmost needle will come up within said bight.

10. The method of widening incident to the production of ringless fabric on a flat knitting machine having a series of needles and cooperative sinkers, and a plurality of traversing yarn carriers for individual yarns of the same kind and count used in alternation and in a recurrent sequence in the knitting, by repetitions of a cycle as each of the yarns is used which cycle includes moving one of the carriers to lay its yarn across a definite number of needles in the knitting cycle; then with the active yarn carrier resting at the end of its traverse forming a new course of loops from the yarn; then at an intermediate stage in the knitting cycle when the needles have substantially reached the knock-over level with the sinkers retracted, shifting the active yarn carrier outward to the extent of one or more needles to a new stop position to lay its yarn over the ends of the sinkers associated with the added needles, so that as the sinkers are advanced while the needles are still down in the knitting phase, the added length of the yarn is displaced in the form of a bight rearward of the endmost added needle, and so that as the needles rise at the completion of the knitting phase said endmost needle will come up within said bight.

11. The method of widening incident to the production of ringless fabric on a flat knitting machine having a series of needles and cooperative sinkers, and a plurality of traversing carriers for individual yarns of the same kind and count used in alternation and in a recurrent sequence, by repetitions of a cycle as each yarn is used, which cycle involves forming a course of loops from one of the yarns in a knitting phase, on a definite number of needles; and then causing the machine to go into a narrowing phase and at a time when the sinkers are retracted, giving the active carrier an additional outward shift in the same direction in which it was moved during the knitting phase to the extent of two or more needles to lay the yarn over the ends of the sinkers associated with the added needles, so that as the sinkers are projected while the needles are down at a later time in the narrowing phase, the added length of the yarn will be displaced as a bight rearwardly of the endmost added needle, and so that at a later time in the narrowing phase as the needles rise, the endmost needle will come up within said bight.

12. The method of widening incident to the production of ringless fabric on a flat knitting machine having a series of spring beard needles and cooperative sinkers, a needle beard covering point, and a plurality of traversing carriers for individual yarns of the same kind and count used in alternation and in a recurrent cycle, by repetitions of a cycle as each yarn is used, which cycle involves moving one of the carriers to lay its yarn across a definite number of needles; then while the active yarn carrier is resting at the end of its traverse, causing the needles to descend with the beard covering point engaging a needle outward beyond the last needle fed; thus at a time when the sinkers are retracted after having sunk the yarn and the new course of loops is formed with the needles substantially at the knock-over level, shifting the active carrier outward to a position past the needle beyond the contacted needle aforesaid to lay the yarn over the ends of the sinkers associated with the added needles; then at a time when the needles are depressed, projecting the sinkers so that the added length of the yarn is displaced as a bight rearward of the endmost added needle; and finally causing the needles to rise so that the endmost needle will come up within said bight.

13. The method of widening incident to the production of reinforced ringless fabric on a flat knitting machine having a series of needles and cooperative sinkers, a plurality of main carriers for individual yarns of the same kind and count used in alternation and in a definite recurrent sequence and a carrier for an auxiliary yarn, by repetition of a cycle as each of the main yarns is used, which cycle involves concurrently moving one of the main yarn carriers and the auxiliary carrier to lay their yarns and temporarily arresting the main yarn carrier after feeding a definite number of needles while allowing the auxiliary carrier to continue in its movement to the extent of one or more needles; causing the sinkers to be projected and the needles to descend to form a course of loops from the newly laid yarns; then at a time when the sinkers are retracted shifting the active main carrier outward into line with the auxiliary carrier to lay its yarn across the ends of the sinkers associated with the added needles, then while the needles are down causing the added length of the main yarn to be displaced as a bight rearward of the endmost added needle; and finally causing the needles to rise so that said endmost needle will come up within said bight.

14. The method of widening incident to the production of reinforced ringless fabric on a flat knitting machine having a series of needles and cooperative sinkers, a plurality of traversing carriers for individual main yarns of the same kind and count used in alternation and in a definite recurrent sequence in the knitting, and an auxiliary yarn carrier, by repetitions of a cycle as each of the main yarns is used, which cycle involves concurrently moving one of the main carriers and the auxiliary carrier to lay their yarns and temporarily arresting the main carrier after feeding a definite number of needles while allowing the auxiliary carrier to continue in its movement to the extent of one or more needles in a knitting phase of the machine; and then at a later time in the knitting phase after the yarns have been sunk, the new course formed and the needles have about reached their lowermost position with the sinkers retracted, shifting the active main yarn carrier outward into line with the reinforcing yarn carrier, to lay its yarn across the ends of the sinkers associated with the added needles, so that upon projection of the sinkers while the needles are still down, the added length of the main yarn will be displaced as a bight to the rear of the endmost added needle, and so that as the needles rise at the completion of the knitting phase, said endmost needle will come up within said bight.

15. The method of widening incident to the production of reinforced ringless fabric on a flat knitting machine having a series of needles and cooperative sinkers, a plurality of traversing carriers for individual main yarns used in alternation and in a definite recurrent sequence in the knitting, and a reinforcing yarn carrier, by repetitions of a cycle, which, as each of the main yarns is used, involves concurrently moving one of the main yarn carriers and the reinforcing yarn carrier to lay their yarns across a definite number of needles and forming a course of loops from the newly laid yarns during a knitting cycye; and then causing the machine to go into a narrowing phase and at a time in such phase while the sinkers are retracted, shifting the two active carriers outward by the distance of one or more needles to lay their yarns across the ends of the sinkers associated with the added needles, so that as the sinkers are advanced with the needles still down later in the narrowing phase, the additional lengths of the two yarns are displaced as bights rearward of the endmost added needles, and so that as the needles rise before the completion of the narrowing phase, said needle will come up within said bights.

16. The method of widening incident to the production of reinforced ringless fabric on a flat knitting machine having a series of spring beard needles and cooperative sinkers, a needle beard covering point, a plurality of traversing carriers for individual main yarns of the same kind and count used in alternation and in a definite recurrent sequence, and an auxiliary yarn carrier, by repetition of a cycle which, as each of the main yarns is used, involves moving one of the main carriers and the auxiliary carrier concurrently to lay the yarns across a definite number of needles; causing the needles to descend with the beard covering point engaging a needle outward beyond the last needle fed; then at a time when the sinkers are retracted after having sunk the yarn and the new course of loops is formed with the needles substantially at the knock-over level, concurrently shifting the active main yarn carrier and the auxiliary yarn carrier outward to a position past the needle beyond the contacted needle aforesaid to lay the yarns over the ends of the sinkers associated with the added needles; then at a time when the needles are depressed, projecting the sinkers so that the added lengths of the yarns are displaced as bights rearward of the endmost added needle; and finally causing the needles to rise so that the endmost needle will come up within said bights.

17. The method of producing reinforced selvage fabric on a flat knitting machine having a series of needles and cooperative sinkers, and carriers respectively for main and auxiliary yarns, by repetitions of a cycle which involves concurrently moving the two carriers to lay their yarns, temporarily arresting the main carrier after a definite number of needles are fed while permitting the auxiliary carrier to continue in its movement to the extent of one or more needles; then at a time when the sinkers are retracted after having sunk the newly laid yarns and the new course of loops is formed from said warns, shifting the active main carrier outward into line with the auxiliary carrier to lay its yarn over the ends of the sinkers associated with the intervening needle or needles.

18. The method of producing reinforced selvaged ringless fabric on a flat knitting machine having a series of needles and cooperative sinkers, traversing carriers respectively for plural main yarns used in alternation and in a definite recurring sequence in the knitting, and a carrier for an auxiliary yarn, by repetitions of a cycle which involves concurrently moving the two carriers to lay their yarns, temporarily arresting the active main carrier after a definite number of needles are fed while permitting the auxiliary carrier to continue in its movement to the extent of one or more needles; then at a time when the sinkers are retracted after having sunk the newly laid yarns, and the new course of loops is formed from said yarns, shifting the active main carrier outward into line with the auxiliary carrier to lay its yarn over the ends of the sinkers associated with the intervening needle or needles.

OTTO F. SMETANA.